United States Patent [19]

Seipp

[11] 3,827,030

[45] July 30, 1974

[54] PROGRAMMABLE CONTROLLER USING A RANDOM ACCESS MEMORY

[75] Inventor: William H. Seipp, Bettendorf, Iowa

[73] Assignee: Gulf & Western Industries, Inc., New York, N.Y.

[22] Filed: Jan. 29, 1973

[21] Appl. No.: 327,872

[52] U.S. Cl. .......................... 340/172.5, 235/151.11
[51] Int. Cl. .......................... G05b 11/00, G06f 1/00
[58] Field of Search .................................. 340/172.5

[56] References Cited

UNITED STATES PATENTS

| | | | |
|---|---|---|---|
| 3,188,452 | 6/1965 | Asbury | 340/172.5 X |
| 3,321,747 | 5/1967 | Adamson | 340/172.5 |
| 3,686,639 | 8/1972 | Fletcher et al. | 340/172.5 |
| 3,701,113 | 10/1972 | Chace et al. | 340/172.5 |
| 3,719,931 | 3/1973 | Schroeder | 340/172.5 |
| 3,731,280 | 5/1973 | Shevlin | 340/172.5 |
| 3,740,722 | 6/1973 | Greenberg et al. | 340/172.5 |

OTHER PUBLICATIONS

The Bulletin "PMC 1750 Programmable Matrix Controller," Publication SD23, Allen-Bradley Corp., August 1972.

"Programming Information Bulletin 1750 PMC," Publication SD26, Allen-Bradley Corp., June 1972.

R. F. Huber, "Programmable Controls: Where The Action Is" in Production, Vol. 68, No. 3, Sept. 1971; pp. 86ff.

N. Andreiev, "Programmable Logic Controllers–An Update" in Contra Engineering, Sept. 1972, pp. 45ff.

E. J. Stefanides "PROM Provides Flexible N/C Logic" in Design News, Jan. 22, 1973, pp. 50–51.

*Primary Examiner*—Paul J. Henon
*Assistant Examiner*—Melvin B. Chapnick
*Attorney, Agent, or Firm*—Meyer Tilberry & Body

[57] ABSTRACT

A programmable controller of the type used to process logic from input and output circuits for controlling the operation of machines, manufacturing processes and similar mechanical systems. The controller is operated by a series of successive binary coded program statements which are separately processed to perform logic operations or functions in a single bit accumulator register and to store the logic from the accumulator register in selected output circuits or in selected locations of a random access memory forming part of the controller and separate from the input or output circuits.

67 Claims, 31 Drawing Figures

| RESET A | CLK | A | B | RESET |
|---|---|---|---|---|
| 0 | MANY | 0 | 0 | 1 |
| 1 | 1 | 1 | 0 | 1 |
| 1 | 2 | 1 | 1 | 0 |

OPERATION CODE REFERENCE CHART

| INSTRUCTION CODE | | | | ADDRESS CODE | | | FUNCTION |
|---|---|---|---|---|---|---|---|
| I3 | I2 | I1 | I0 | A7 TO A2 | A1 | A0 | |
| 1 | 1 | 1 | 1 | X | X | X | LOAD I/O |
| 1 | 1 | 1 | 0 | X | X | X | LOAD RAM |
| 1 | 1 | 0 | 1 | X | X | X | STO I/O |
| 1 | 1 | 0 | 0 | X | X | X | STO RAM |
| 1 | 0 | 0 | 1 | X | X | X | AND I/O |
| 1 | 0 | 0 | 0 | X | X | X | AND RAM |
| 0 | 1 | 0 | 1 | X | X | X | OR I/O |
| 0 | 1 | 0 | 0 | X | X | X | OR RAM |
| 0 | 0 | 1 | 1 | X | X | 0 | SET PAGE 0 |
| 0 | 0 | 1 | 1 | X | X | 1 | SET PAGE 1 |
| 0 | 0 | 1 | 0 | X | 0 | 0 | INVERT |
| 0 | 0 | 1 | 0 | X | 0 | 1 | LOAD PWR LATCH |
| 0 | 0 | 1 | 0 | X | 1 | 0 | STO PWR L AND INV |
| 0 | 0 | 1 | 0 | X | 1 | 1 | STO POWER LATCH |
| 0 | 1 | 1 | 1 | X | X | X | CAND I/O |
| 0 | 1 | 1 | 0 | X | X | X | CAND RAM |
| 1 | 0 | 1 | 1 | X | X | X | COR I/O |
| 1 | 0 | 1 | 0 | X | X | X | COR RAM |
| 0 | 0 | 0 | 1 | X | X | X | STO SEIPP |
| 0 | 0 | 0 | 0 | X | X | X | NO OP |

| C | B | A | DATA LINE SELECTED |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

NOTES:

TRUTH TABLE ASSUMES E INPUT TO BE LOGIC 0. IF E IS LOGIC 1, Z=LOGIC 0, Z̄=LOGIC 1, REGARDLESS OF A,B, AND C INPUTS.

Z OUTPUT WILL BE LOGIC STATE OF SELECTED INPUT LINE.

Z̄ OUTPUT WILL BE INVERTED LOGIC STATE OF SELECTED INPUT LINE.

| CODE | FUNCTION |
|---|---|
| LDA | LOAD ACCUMULATOR |
| STO | STORE RAM OR I/O |
| SPG | SET PAGE |
| STS | STORE SEIPP |
| NOP | NO EFFECT |
FIG. 11
PROGRAMMING EXAMPLE 1
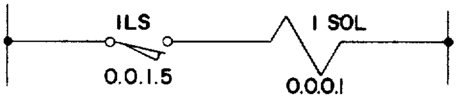
PROGRAM:
| | | |
|---|---|---|
| LDA | I/O | 0.0.1.5 |
| STO | I/O | 0.0.0.1 |
FIG. 13
PROGRAMMING EXAMPLE 2
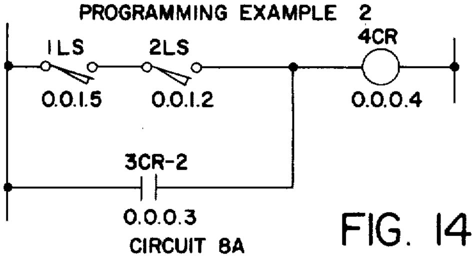
FIG. 14
CIRCUIT 8A
PROGRAM:
| | | |
|---|---|---|
| LDA | I/O | 0.0.1.2 |
| AND | I/O | 0.0.1.5 |
| OR | RAM | 0.0.0.3 |
| STO | RAM | 0.0.0.4 |
| | -OR- | |
| LDA | I/O | 0.0.1.5 |
| AND | I/O | 0.0.1.2 |
| OR | RAM | 0.0.0.3 |
| STO | RAM | 0.0.0.4 |
PROGRAMMING EXAMPLE 3
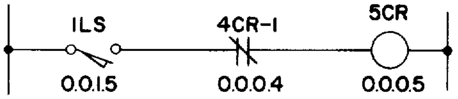
PROGRAM:
| | | |
|---|---|---|
| LDA | I/O | 0.0.1.5 |
| CAND | RAM | 0.0.0.4 |
| STO | RAM | 0.0.0.5 |
FIG. 15
PROGRAMMING EXAMPLE 4
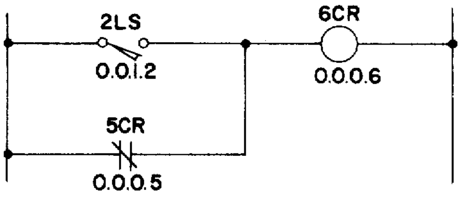
PROGRAM:
| | | |
|---|---|---|
| LDA | I/O | 0.0.1.2 |
| COR | RAM | 0.0.0.5 |
| STO | RAM | 0.0.0.6 |
FIG. 16

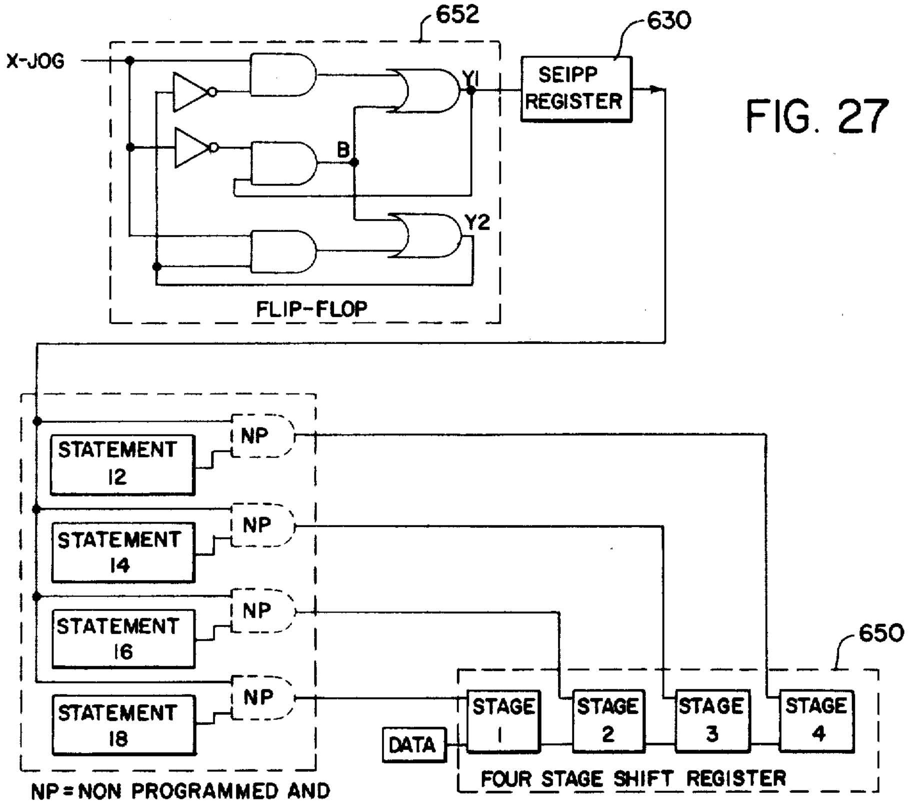

FIG. 27

NP = NON PROGRAMMED AND GATES REPRESENTING AFFECT OF SEIPP REGISTER ON SHIFTING

FIG. 22

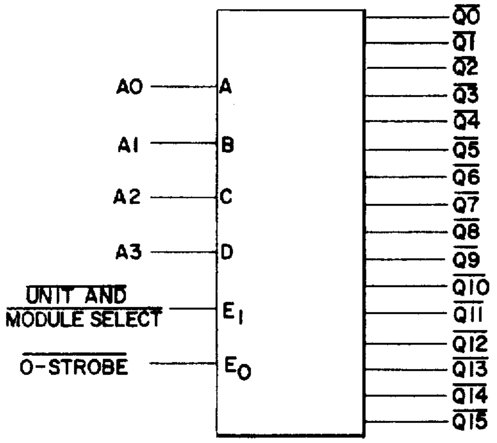

| D | C | B | A | OUTPUT ACTIVATED |
|---|---|---|---|---|
| 0 | 0 | 0 | 0 | $\overline{Q0}$ |
| 0 | 0 | 0 | 1 | $\overline{Q1}$ |
| 0 | 0 | 1 | 0 | $\overline{Q2}$ |
| 0 | 0 | 1 | 1 | $\overline{Q3}$ |
| 0 | 1 | 0 | 0 | $\overline{Q4}$ |
| 0 | 1 | 0 | 1 | $\overline{Q5}$ |
| 0 | 1 | 1 | 0 | $\overline{Q6}$ |
| 0 | 1 | 1 | 1 | $\overline{Q7}$ |
| 1 | 0 | 0 | 0 | $\overline{Q8}$ |
| 1 | 0 | 0 | 1 | $\overline{Q9}$ |
| 1 | 0 | 1 | 0 | $\overline{Q10}$ |
| 1 | 0 | 1 | 1 | $\overline{Q11}$ |
| 1 | 1 | 0 | 0 | $\overline{Q12}$ |
| 1 | 1 | 0 | 1 | $\overline{Q13}$ |
| 1 | 1 | 1 | 0 | $\overline{Q14}$ |
| 1 | 1 | 1 | 1 | $\overline{Q15}$ |

NOTES:
TRUTH TABLE ASSUMES BOTH ENABLE INPUTS, $E_0$ AND $E_1$, TO BE LOW. IF EITHER ARE HIGH, ALL OUTPUTS ARE LOGIC 1 REGARDLESS OF THE A, B, C, D INPUT STATUS.
ACTIVATED OUTPUT IS LOW. ALL OTHERS ARE HIGH.

| STATEMENT NUMBER | OPERATION | ADDRESS I/O | RAM | P. | U. | M. | CKT. | CKT. NAME | REMARKS |
|---|---|---|---|---|---|---|---|---|---|
| 0 | LDA | | X | 0 | 0 | 0 | 0 | YI | |
| 1 | CAND | X | | 0 | 0 | 0 | 1 | X-JOG | |
| 2 | STO | | X | 0 | 0 | 0 | 2 | 8 | |
| 3 | LDA | X | | 0 | 0 | 0 | 1 | X-JOG | |
| 4 | AND | | X | 0 | 0 | 0 | 1 | Y2 | |
| 5 | OR | | X | 0 | 0 | 0 | 2 | 8 | FLIP-FLOP SET |
| 6 | STO | | X | 0 | 0 | 0 | 1 | Y2 | |
| 7 | LDA | X | | 0 | 0 | 0 | 1 | X-JOG | |
| 8 | CAND | | X | 0 | 0 | 0 | 1 | Y2 | |
| 9 | OR | | X | 0 | 0 | 0 | 2 | 8 | |
| 10 | STS | | X | 0 | 0 | 0 | 0 | YI | |
| 11 | LDA | | X | 0 | 0 | 0 | 5 | 3 | |
| 12 | STO | | X | 0 | 0 | 0 | 6 | 4 | |
| 13 | LDA | | X | 0 | 0 | 0 | 4 | 2 | |
| 14 | STO | | X | 0 | 0 | 0 | 5 | 3 | |
| 15 | LDA | | X | 0 | 0 | 0 | 3 | 1 | 4 STAGE SHIFT REG. |
| 16 | STO | | X | 0 | 0 | 0 | 4 | 2 | |
| 17 | LDA | X | | 0 | 0 | 0 | 2 | DATA | |
| 18 | STO | | X | | | | | 1 | |
| 19 | LDA | | X | 0 | 0 | 0 | 0 | YI | |
| 20 | STO | | X | 0 | 0 | 0 | 1 | Y2 | FLIP-FLOP RESET |
| 21 | INV | | | | | | | | |
| 22 | STO | | X | | | | 0 | YI | |
| 23 | LDA | X | | 0 | 3 | 3 | 15 | LOGIC "1" | SEIPP REG. RESET TO LOGIC "1" |
| 24 | STS | | X | 0 | 3 | 3 | 15 | LOGIC "1" | |

PROGRAMMABLE CONTROLLER USING A RANDOM ACCESS MEMORY

The present invention relates to the art of controllers for mechanical systems and other systems requiring logic processing of input data and more particularly to a programmable controller using a random access memory for storing certain intermediate logic data for subsequent use in the controller.

The invention is particularly applicable as a programmable controller to control a machine tool, or other mechanical system of the type generally controlled by a relay logic system, and it will be described with particular reference thereto; however, it should be appreciated that the invention has much broader applications and may be used in various installations wherein logic is to be processed in accordance with a relay logic diagram, a standard logic diagram, or a Boolean equation. For instance, the controller can be used for interfacing and logic processing of inputs to a computer. In this situation, 110 volt inputs can be conveniently converted into binary logic for use by a computer.

BACKGROUND OF THE INVENTION

Mechanical systems and machines are generally controlled in accordance with a relay logic diagram known as a "ladder" diagram which includes a series of input switches, output circuits, control relays and contacts operated in accordance with the condition of the control relay. When these systems were hard wired in accordance with the relay logic diagram, each of the various components, which were generally electromechanical, were provided separately to obtain the desired function for the equipment being controlled. This procedure was used for many years, and maintenance personnel became quite adept at reading the relay logic diagrams and maintaining the basically electromechanical control systems. However, it was expensive and required a substantial amount of space.

With the advent of solid state technology, it become possible to reduce the size and complexity of such control circuits by the use of this technology. As a first step, various electro-mechanical components were replaced by solid state devices. This was a relatively simple operation and did not unduly complicate maintenance of these systems. Maintenance personnel required only a limited amount of retraining to become familiar with the solid state components replacing the various components found in a standard relay logic diagram. Indeed, often the solid state components were labeled in accordance with the nomenclature used in relay logic. This type system is now used; however, it still requires a substantial amount of components and relatively large space. Consequently, the control technology advanced to the card logic concept wherein a number of cards containing logic gates were used as substitution for several of the components found in a standard relay logic diagram. This arrangement was quite successful; however, a substantial amount of cards were required and maintanance personnel had to be trained to locate the defective card when maintenance was required.

The card logic control system was replaced, in some instances, by a sequence type controller including a series of modules, such as an output diode matrix, program sequencer and input diode matrix. This type of system could read input conditions and create output signals in accordance with the output of the program sequencer. The use of diode matrixes for each of the input and output circuits substantially limited the application of the sequence controller. Consequently, the sequence controller had application for relatively simple control operation. The same is true of the two control systems mentioned previously. As larger systems were to be controlled, the cost of these three systems became prohibitive. Consequently, it was necessary to develop a controller for controlling a wide range of systems without requiring substantial changes for the larger systems. The basic answer to this necessity has been the use of an expensive mini-computer. A mini-computer included mean for programming the computer with a tape or otherwise so that it could perform a sequence of logic operations corresponding to the relay logic of a standard relay logic diagram. The disadvantage of the mini-computer concept was that a mini-computer is a shelf item which is relatively expensive and generally too complex for the normal control application. Consequently, the fixed cost of a mini-computer controller was quite high and could be economically justified for only relatively complex systems. To program a mini-computer controller a trained programmer is required to convert logic functions into the complex language of a computer. To perform most of the logic operations, many separate and distinct program statements must be created. Consequently, simple logic functions are converted to special complex language.

SUMMARY OF THE INVENTION

A review of the above described technology indicates that there is a substantial demand for a relatively low cost controller for mechanical systems which can be adapted for handling both relatively simple systems and complex systems. The present invention relates to a controller which meets this need by providing a programmable means and a random access memory in a system which, unlike a mini-computer, accepts logic function in their known form and does not require several statements for performing the basic logic functions, i.e. functions such as AND, OR and INVERT. Consequently, the controller can be programmed by a person having little instruction and is not as expensive as a mini-computer type controller.

In accordance with the present invention, there is provided a programmable controller for processing logic from addressed locations and storing logic in addressed locations, the controller includes a read only program memory having a finite number of output terminals capable of receiving binary logic from the memory, counter means for repetitively creating a known, finite number of separate and successive binary output codes, means for directing the successive output codes from said counter means to the program memory, and means in the program memory for creating a succession of binary codes at the memory output terminals in response to the successive output codes from said counter means, each of the codes including a separate statement to be performed by the programmable controller.

In this manner, a series of program statements stored within the program memory are successively called up upon receipt by the memory of binary code from the counter. The counter has a given number of separate output codes which limits the number of memory statements which can be produced by the read only program memory. Additional program memory modules can be incorporated until there is a capability of creating the same number of statements as found in the coded output of the counter. The counter cycles repetitively during a single scan, which calls up all the statements within the read only program memory each time the scan is performed. Consequently, the statements which are loaded into the read only program memory are performed in sequence and successively on each count of the decoded counter.

In accordance with another aspect of the present invention, a random access memory is used for storing logic to be used by statements created by read only program memory when it receives coded counting pulses.

In accordance with another aspect of the present invention, the controller includes a circuit for inhibiting certain statements from being performed although they are actually processed by the controller. In this manner, the controller can be adapted to perform the function of a shift register, counting device, or timer or other non-basic data handling functions.

In accordance with another aspect of the invention, there is provided indicating circuits for indicating the condition of the several input circuits and output circuits of the controller. These indicating circuits include light emitting diodes which are controlled by the logic seen by or directed from the controller, as opposed to the condition of the actual input or output circuits. In this way, a cursory amination of the indicating circuits gives an accurate indication of the internal functions of the programmable controller and not necessarily the condition of the actual input or output devices. Maintenance of the programmable controller is quite easily performed, since the source of the difficulty can be more quickly located.

In accordance with another aspect of the present invention, there is provided a random access memory of the type which can retain logic on the various memory locations and a battery means which applies holding voltage to the random access memory during shut down and power interruption to the controller. By using this structure, the logic within the random access memory used in the programmable controller is retained for a relatively long period of time so that the controller logic is not erased during power failures.

In accordance with another aspect of the present invention, there is provided a circuit for holding the logic at the input circuits for a short period of time during momentary interruption of power to the controller. In this manner, the controller "remembers" the input logic at the various input circuits for a short time so that improper logic processing does not occur after a momentary power failure.

In accordance with another aspect of the present invention, there is provided a circuit for the programmable controller which allows the program counter to cycle through at least one complete scan prior to performing the first program statement. During this time, random access memory, the various flip-flops and logic latches of the controller are reset to an initial known condition for subsequent processing by the program memory statements. Consequently, the controller always starts processing logic at the same condition to prevent improper processing.

The primary object of the present invention is the provision of a programmable controller for processing logic from addressed locations to develop output logic, which controller is relatively inexpensive and can be used for a wide variety of mechanical systems.

Another object of the present invention is the provision of a programmable controller as defined above, which controller utilizes a random access memory for storing of intermediate logic results and other logic information.

Another object of the present invention is the provision of a programmable controller as defined above, which controller can be expanded to accept a large number of input and output circuits.

BRIEF DESCRIPTION OF THE INVENTION

These and other objects and advantages will become apparent from the following description taken together with the accompanying drawings in which:

FIG. 11 is a chart illustrating the code used for certain operational functions of the programmable controller;

FIGS. 13–16 are programming examples for the programmable controller;

FIG. 22 is a schematic representation of a decoder for four inputs and its truth table, as used in the preferred embodiment of the present invention;

FIG. 27 is a logic diagram illustrating the use of the Seipp register as shown in FIG. 26;

PURPOSE AND GENERAL OPERATION OF THE PREFERRED EMBODIMENT

The programmable controller A shown schematically in FIGS. 1, 2, 3 and 4, is used to control the operation of industrial machines and systems having a number of selected inputs and outputs. Basically, the programmable controller A can perform any function which can be performed by a standard relay logic control system for a machine tool or similar piece of apparatus. The inputs are sensed and the outputs are created in accordance with an internally programmed series of instructions, which are derived from either a standard relay logic circuit, a logic diagram, or Boolean equations. The function of the programmable controller will become more apparent in a later section regarding the programming of this device.

Figure 2:
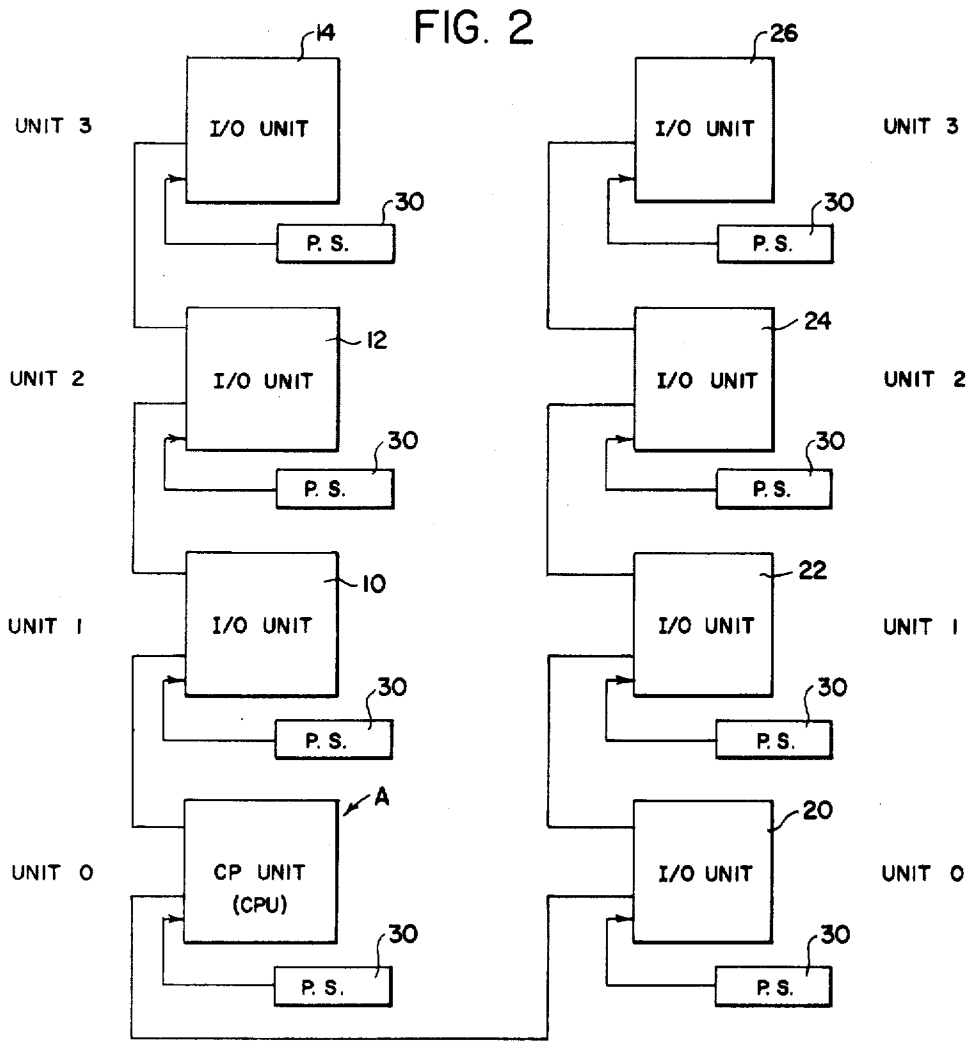
FIG. 2 is a block diagram illustrating schematically the manner in which additional inputs and outputs can be provided on the basic controller illustrated in FIG. 1.

Referring now to FIG. 2, the programmable controller A includes a basic unit CPU. This unit includes all of the necessary circuits of the programmable controller. If additional inputs and/or outputs are required, add-on units 10, 12, 14 may be connected in parallel with the basic CPU. These add-on units, numbered 1, 2 and 3, with the inputs and outputs of the basic CPU, numbered unit 0, for Page 0 of the input/output (I/O) circuits. If still further inputs and/or outputs are required, additional add-on units 20, 22, 24 and 26 are connected in parallel with the prior units. To minimize the internal circuitry, the units 22–26 are identified as Page 1 and units Nos. 0, 1, 2 and 3. From this layout it is seen that the output or input circuits are identifiable in the layout drawing with a particular page number and unit number. The page number can be controlled by a single line that is selectably shifted between a logic 0 and a logic 1. The unit numbers can be controlled by two lines each having binary logic 0 or logic 1. Consequently, with the particular layout set forth in FIG. 2, the units and pages can be controlled by three lines. The CPU includes the circuits for processing logic and also Page 0, Unit 0 input and output circuits.

Figure 1:
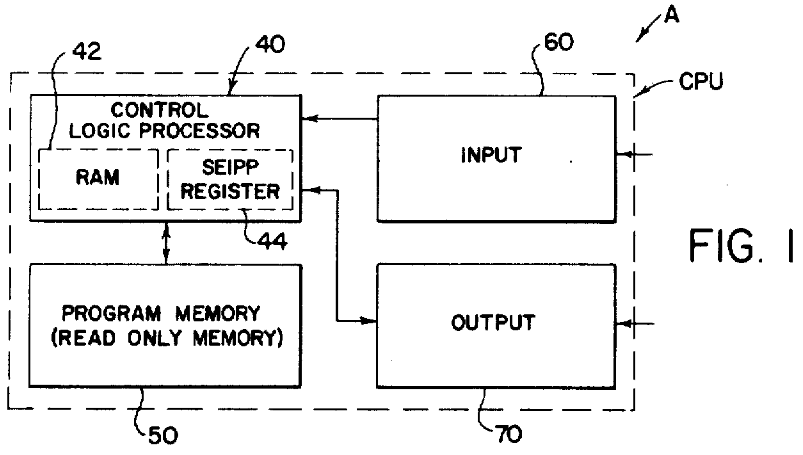
FIG. 1 is a block diagram illustrating certain basic components of the programmable controller.

The CPU, shown schematically in FIG. 1, includes a control logic processor 40 having a random access memory (RAM) 42 and a Seipp register 44, a program memory 50, an input circuit or module 60 and an output circuit or module 70. For future reference, the control logic processor 40 is shown in detail in FIG. 5 including separate sections labeled FIGS. 5A, 5B, 5C and 5D. The program memory 50, the input circuit or module 60 and the output circuit or module 70 are shown in detail in FIGS. 6A and 6B, 7 and 8, respectively.

Figure 3:
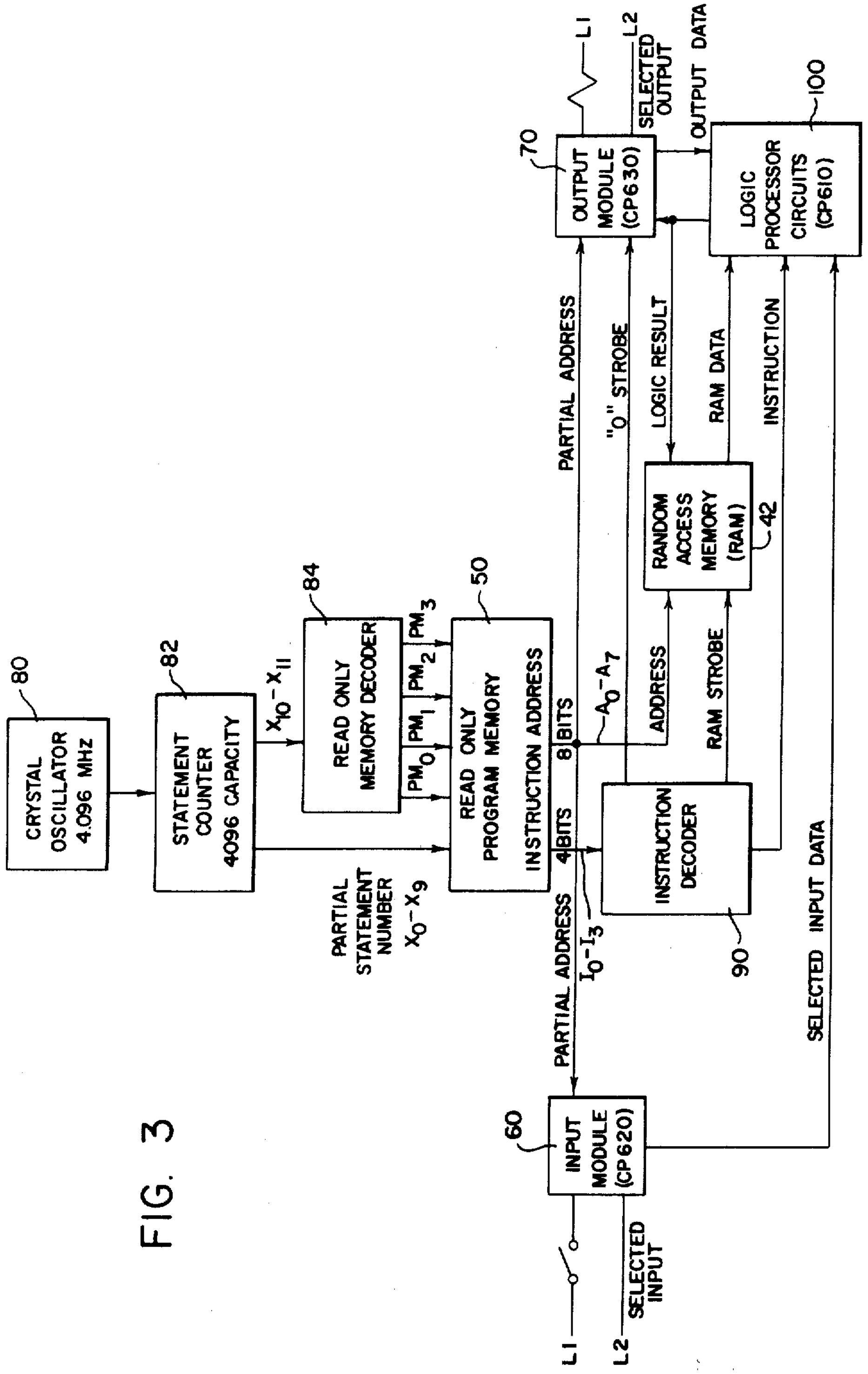
FIG. 3 is a block diagram illustrating, in more detail, certain basic components of the preferred embodiment of the present invention.
Figure 4:
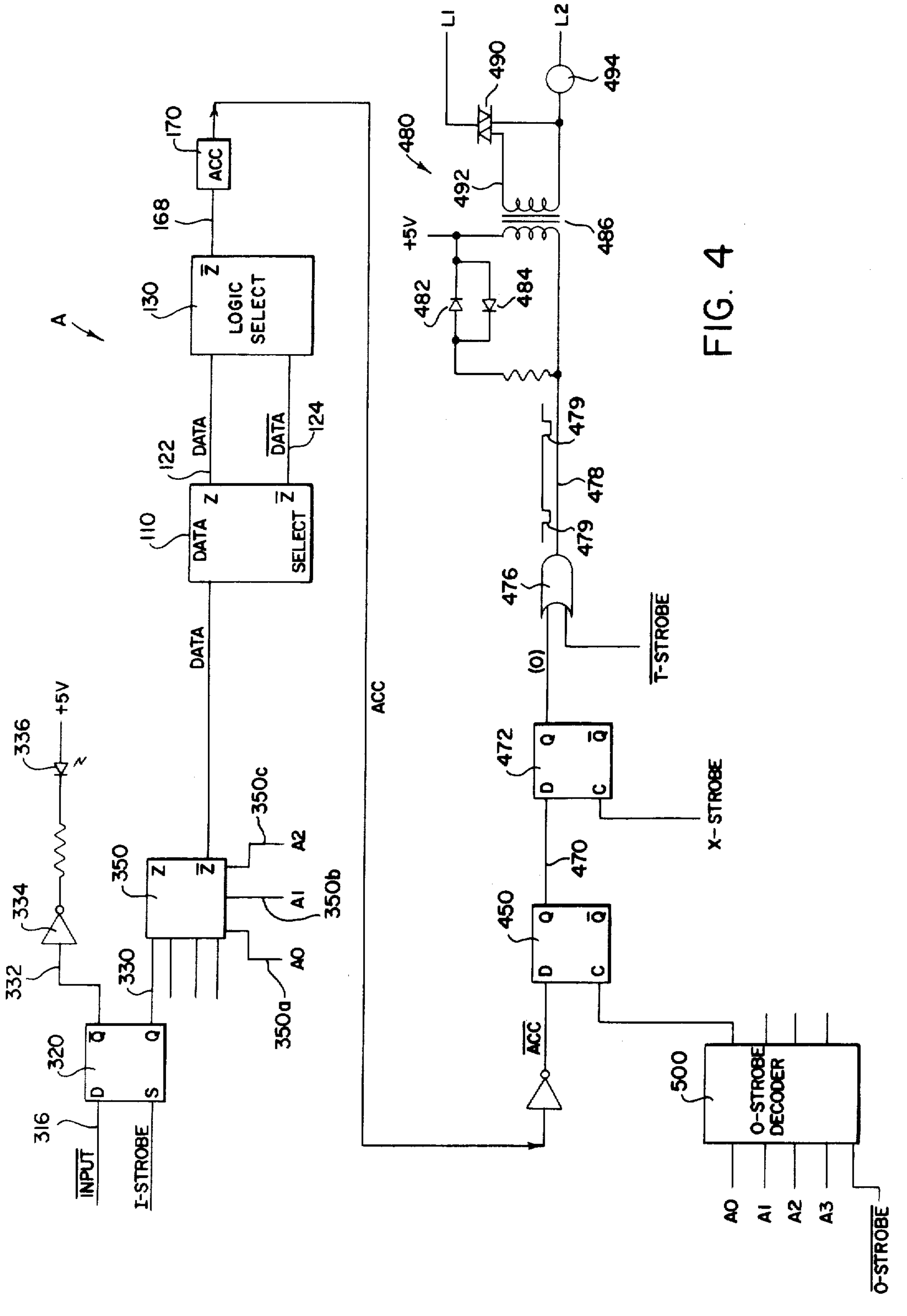
FIG. 4 is a schematic wiring diagram and block diagram showing, in simplified form, the basic input and output concepts employed in the preferred embodiment of the present invention.

The basic circuits of the programmable controller A are set forth in more detail in FIG. 3. In accordance with this figure, a crystal oscillator 80 controls a statement counter 82, which creates binary logic on 12 lines. Ten of these lines are designated $X_0$–$X_9$, and the other two lines are designated $X_{10}$, $X_{11}$. The binary code on these lines is different for each count in a scan of the total counter output. When the last count of the counter appears, the counter starts recycling to again create the codes in sequence. Upon each 10 cycles of oscillator 80, the statement counter 82 produces a new binary logic on lines $X_0$–$X_{11}$. Consequently, there are 4,096 statements per each 0.01 seconds. The statement number lines, $X_0$–$X_{11}$, can be combined to produce a known, finite number of statement codes to give a complete scan of the program for controller A. When maximum capacity is used, such as in the preferred embodiment, this finite number is 4,096. The program scan time, determined by the time to process the known, finite number of codes from counter 82, can be changed by altering the frequency of oscillator 80 and/or circuits connecting the oscillator to the counter.

Figures 9, 12:
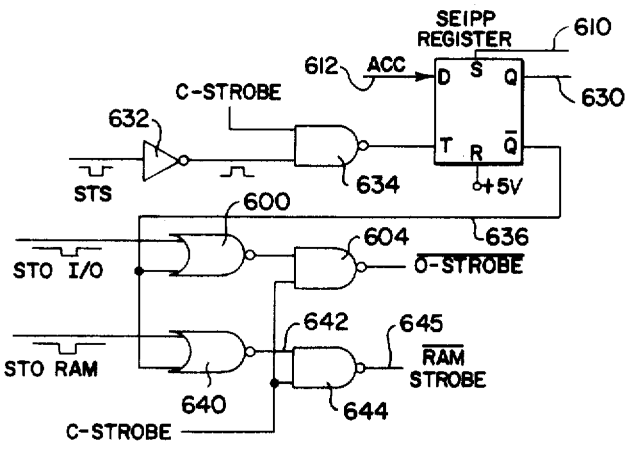
FIG. 9 is a table illustrating the instructions and functions performed by the preferred embodiment of the present invention.
FIG. 12 is a schematic logic diagram of the Seipp register constructed in accordance with the present invention.

Lines $X_{10}$, $X_{11}$ are decoded by a decoder 84 to produce output lines $PM_0$–$PM_3$. These output lines address, or energize, one or four memory modules within the read only program memory 50, which produces, at any given time, four bits of instruction information on lines $I_0$–$I_3$ and eight bits of address information on lines $A_0$–$A_7$. The instruction information is directed to an instruction decoder 90 which decodes the four bits of instruction information on lines $I_0$–$I_3$. This decoding is shown in FIG. 9. The decoded instruction bits are directed to the logic processing circuits 100, which include several circuits to be described later. Address bits from program memory 50, at each of the separate and distinct statements, addresses both the input module 60 and the output module 70, as well as the random access memory (RAM) 42. Consequently, according to the particular component for which an instruction is received, the information, or address, on lines $A_0$–$A_7$ assures that the information is placed in the proper component or removed from the proper component. The logic processor circuit 100 acts upon data from the input module 60, the output module 70, and the random access memory 42 in accordance with the instructions from instruction decoder 90.

In essence, the read only program memory 50 produces a series of twelve bit statements each of which includes four bits of instructions $I_0$–$I_3$ and eight bits of addresses $A_0$–$A_7$. Each of these statements is processed in series and then repeated after the last statement position (No. 4095) has been reached in the program memory. Because of the speed of the statement counter, the total 4096 statements can be brought up in 10 milliseconds. Consequently, 100 complete scans of all statements within the program memory 50 occurs each second. In view of this, the changes in input and output appear to be instantaneous, although they are held momentarily during the cycling of the program memory. By using the random access memory 42, information may be stored in this memory for use in subsequent statements from the program memory. This adds a new dimension to the programmable controller in that certain internal functions may be stored in the memory and not occupy input or output positions. This substantially reduces the number of external circuits required for the programmable controller A.

PROGRAMMING THE CONTROLLER

The programmable controller A is used for operating a machine tool, conveying equipment or other such mechanical systems in accordance with a logic diagram, Boolean equations or a relay wiring diagram. In such instances, the inputs to module 60 may be limit switches, selector switches, push buttons or other normal input appliances. The output can be solenoids, lights, motor starters and other output appliances connected to the various circuits of output module 70. Before discussing the details of the circuits and functions of a programmable controller, constructed in accordance with the preferred embodiment of the invention, the procedure for programming the controller will be outlined.

The program of controller A is permanently stored within the read only program memory 50, and it does not change during the operation of the controller. In other words, the memory 50 permanently stores the program for future use. When stored, the program includes a number of successive statements each having an instruction and an address designated for either the random access memory 42 or the input/output modules 60, 70. The inputs and outputs are each provided a number that defines its location in the system. Referring now to FIG. 2, units Nos. 0, 1, 2 and 3 each includes four separate modules, which are numbered 0, 1, 2 and 3. Each of these modules is an input module 60 or an output module 70 and has 16 terminal sets for separate and distinct external circuit connections. The units may include any combination of input and output modules. For instance, one unit can include all output modules 70. Another unit can include one input module 60 and three output modules 70. The combination of modules within each unit is varied to give the desired number of input and output circuits for controller A.

The address of the separate circuits, either input or output, then includes a page number, unit number, module number, and circuit number. The circuits are numbered 0–15 on each of the separate modules within the various units. Examples of certain addresses are listed below:

| | |
|---|---|
| 1.0.3.2 | Page 1, Unit 0, Module 3, Circuit 2 |
| 0.3.0.15 | Page 0, Unit 3, Module 0, Circuit 15 |
| 1.1.5 | Page 0, Unit 1, Module 1, Circuit 5 |
| 0.1.2.3 | Page 0, Unit 1, Module 2, Circuit 3 |

-Continued

| | |
|---|---|
| 1.2.3.11 | Page 1, Unit 2, Module 3, Circuit 11 |
| The lowest address number is: | 0.0.0.0 |
| The highest address number is: | 1.3.3.15 |

The above examples locate either the input or output circuit for any given control function in the apparatus to be controlled by programmable controller A. The random access memory (RAM) 42 also is addressed in a similar manner; however, the address of the memory has no external circuit and only stores either logic 1 or logic 0 in each of the address locations of the RAM. If the RAM has only Page 0, 256 locations would be available. In accordance with the preferred embodiment of the invention, the RAM has Pages 0 and 1, which provides 512 memory locations. In programming the controller A, the location of the various inputs and outputs are given the address according to their particular connection onto the units. The memory address is assigned randomly for use by the programmer. Generally these RAM addresses are selected in series for more uniform programming.

The programmable controller A, in accordance with the preferred embodiment of the invention, performs five separate logic operations. These operations are set forth in FIG. 10, together with the relay logic circuitry which requires the particular function. The AND function is used when a contact for a given address is placed in series with previously processed circuitry. Thus function is basically an AND gate wherein the logic of a particular address is ANDed with the particular logic existing within the single digit accumulator of the controller A. In other words, after all of the logic before the subject contact has been processed and a given logic 0 or logic 1 appears in the accumulator, that accumulator logic is ANDed with the logic of the addressed location, i.e., RAM, input or output, to form the AND function.

Figure 10:
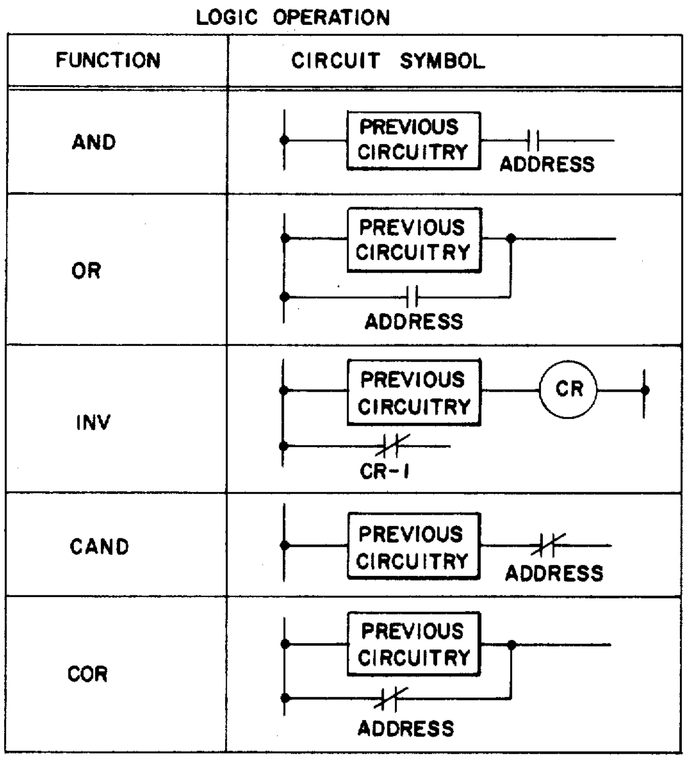
FIG. 10 is a chart illustrating certain logic operations performed by the preferred embodiment of the present invention.

The next logic operation shown in FIG. 10 is the OR function. This function is equivalent to an OR gate and places a new contact in parallel with the previously processed circuitry. In other words, the logic in the single digit accumulator is ORed with the logic at the address on the OR statement. If the logic in the accumulator is logic 1, the ORed logic has no effect. However, if the logic in the accumulator is logic 0, a logic 1 at the new address will produce a logic 1 after the OR function.

The next logic operation shown in FIG. 10 is inversion (INV), which is done with a standard inverter gate. This function, when done by the programmable controller, inverts the logic of the accumulator. For instance, if the accumulator is a logic 1, after inversion the accumulator is at logic 0. In the circuit symbols of FIG. 10, the output of the previous circuit is CR; therefore, after inversion the contact controlled by the relay CR is a normally closed contact.

The next logic function is CAND, which is equivalent to first complimenting, or inverting, the addressed information and then ANDing it with the previous circuit. This can be symbolically represented as a normally closed contact, as shown in FIG. 10. If the logic at the addressed location is a logic 1 indicating that the relay controlling the contact is actuated, this information is inverted to show a logic 0 indicating that the contact is open in the circuit illustrated in FIG. 10. A similar function is produced for the COR function. The addressed data or information is inverted, complimented, and then ORed with the logic result from processing the previous circuitry. This puts an inverted contact in parallel with the previous circuitry.

The logic functions shown in FIG. 10 are the basic logic operations performed by the preferred embodiment of the present invention. Of course, other logic functions may be used if desired. It is possible to reduce the number of logic functions needed in programming by removing the CAND and COR functions and using a number of separate statements. This, however, requires a redrafting of the relay logic or other logic diagrams to convert the CAND and COR functions to combinations of AND, OR and INVERT. The circuitry programmed can be a standard logic diagram or Boolean equations which have the same basic logic functions.

Referring now to FIG. 11, the basic control operations are provided in coded form at the left, and the associated functions are listed at the right. The beginning instruction in any logic function is the load accumulator function (LDA). When this instruction is contained in the instruction portion of a program memory statement, the addressed information is loaded into the single bit accumulator. This logic is then operated upon by additional statements. The load accumulator operation will be addressed to either the RAM or to the input-output modules by an (I/O) address. In other words, the load instruction (LDA) will either load logic from the random access memory 42 or from a circuit on one of the modules 60, 70. If an actuated input circuit is addressed, a logic 1 is loaded in the accumulator on a LDA instruction addressed to this circuit. If an actuated output circuit is loaded into the accumulator, logic 1 is loaded into the accumulator on a LDA instruction addressed to this output circuit. Either a logic 1 or a logic 0 from the addressed location of the RAM is loaded into the accumulator when a LDA RAM instruction appears in a given program statement. Of course, when logic is transferred, loaded or stored, the logic of the source does not change by such action.

The next basic control operation is the store operation (STO) which transfers the logic of the accumulator to the addressed location of an output module 70 or the random access memory 42. In other words, a STO RAM instruction from the program memory places a duplicate of the logic in the accumulator into the addressed location of the RAM.

The next operation is the set page operation (SPG). This operation is used when two separate pages are required because of the number of input and output circuits or the needed RAM locations. When this instruction appears in a statement a page flip-flop is set to the desired logic and selects the proper page in the RAM or the input/output modules. A program includes this instruction whenever the page being used is changed. Until a subsequent SPG instruction is programmed, the controller operates on the newly selected page. At the start up of the controller, the page is set to Page 0; therefore, if there is no SPG instruction, the controller continues to function in logic 0.

Figure 5A:
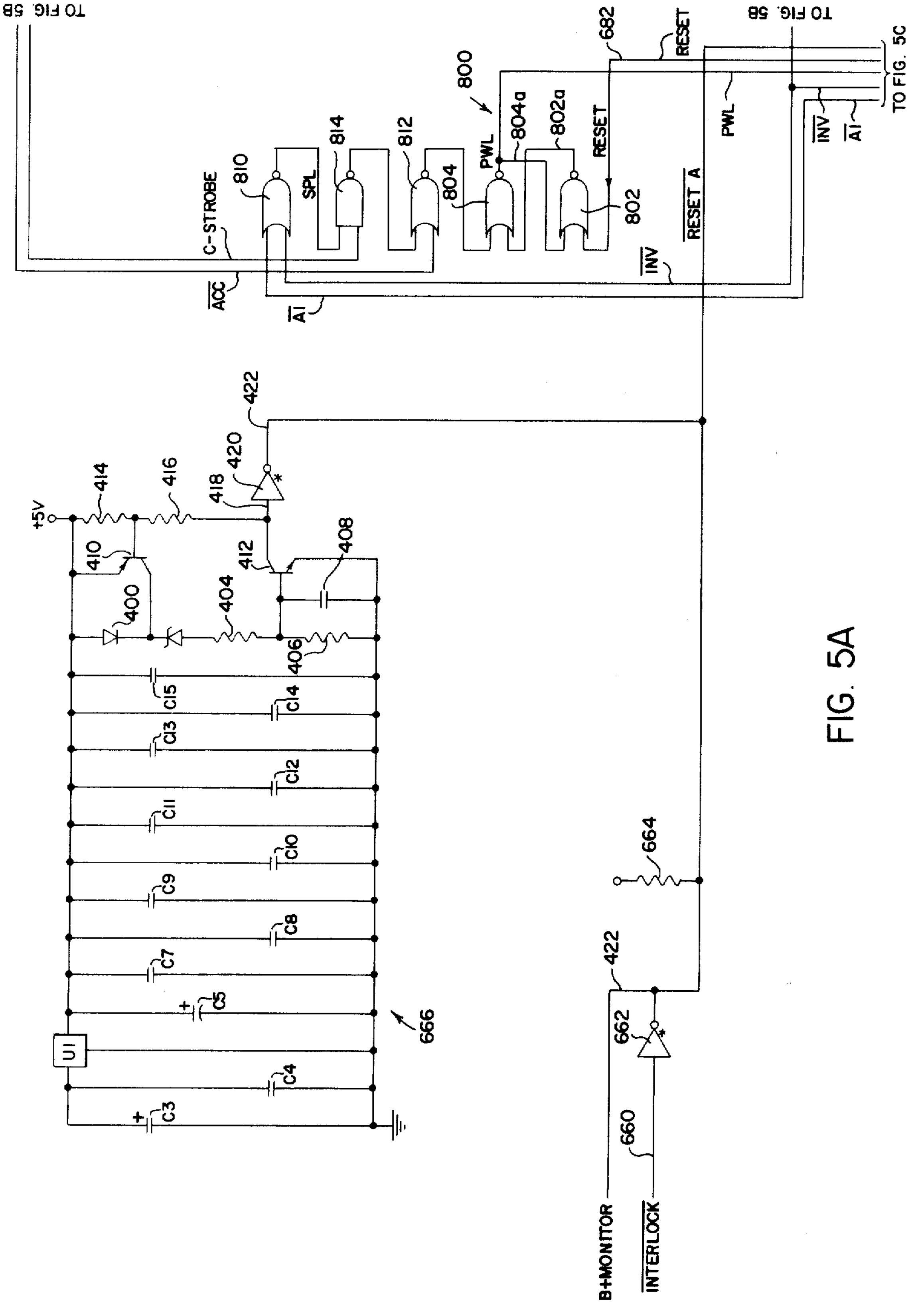
FIG. 5 is a wiring diagram of the basic logic processing circuits in accordance with the preferred embodiment of the present invention and divided into separate views labeled FIGS. 5A–5D.
Figure 5B:
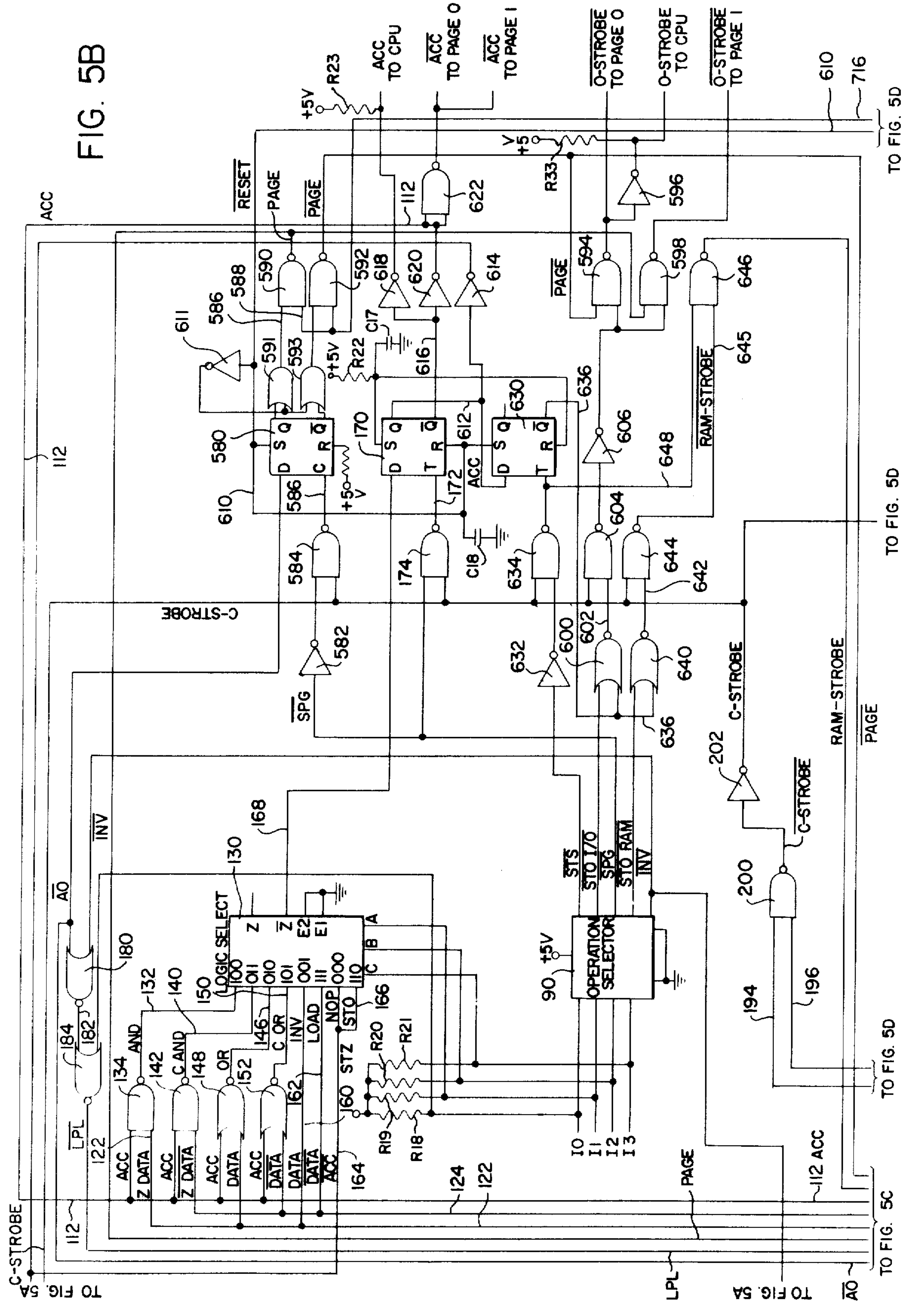

A store Seipp function (STS) is used to allow the skipping of subsequent program statements. Basically, when STS appears in the program statement, the logic from the accumulator is gated to the Seipp register. If this gating turns the Seipp register off (logic 0), the subsequent STO operations in the program are blocked so that they are not performed. When the Seipp register is on (logic 1), the subsequent STO operations are performed in their normal manner. This operation will be explained in more detail with respect to the Seipp register, as shown in FIG. 5B and in FIG. 12.

The last control operation shown in FIG. 11 is the nooperation instruction (NOP). When this operation is contained in the program statement, this statement performs no function. This particular instruction is used to eliminate improperly programmed lines of a program and provides a means for correcting mistakes in the program, even though the statement itself is not erased and still occupies a space in the program memory. This function is useful because the program memory is a read only memory and can not be corrected in all instances. By inserting a NOP instruction a portion of the program can be permanently inhibited and rewritten in proper form later in the program.

Using the above logic operations and control operations any standard relay circuit can be programmed into the programmable controller A. To illustrate how this can be accomplished, a few relatively simple programming examples are set forth in FIGS. 13–16. In Example 1 of FIG. 13, the particular segment of the control circuit being programmed includes a limit switch 1LS of an input board and a solenoid 1SOL of an output board. The limit switch has an address 0.0.1.5. This address means Page 0, Unit 0, Module 1, and Circuit 5 on the input module. The address for the solenoid is 0.0.0.1, which indicates that the output circuit for the solenoid is at Page 0, Unit 0, Module 0, Circuit 1. Since the first step in programming any circuit of the type illustrated includes a LDA instruction, the first statement of the program is LDA I/O 0.0.1.5. This indicates that the first step in the program is to load the logic at circuit No. 5 on the indicated input board into the one digit accumulator. If the logic at this input address is a logic 1, indicating that the limig switch is closed, the solenoid is to be energized. Consequently, the accumulator will have a logic 1 after the first statement is performed. The second statement then stores (STO) the logic 1 into Circuit No. 1 of the designated output module. Circuit No. 1 of the module is thus energized to energize solenoid 1SOL. The store (STO) statement is indicated as STO I/O 0.0.0.1. The program of FIG. 13 indicates that the condition of the limit switch is loaded into the accumulator and the results are then stored in the output circuit to energize the solenoid. This particular circuit logic requires only two statements from the program memory.

Referring now to programming Example 2 shown in FIG. 14, two limit switches 1LS and 2LS are connected in series. The results of the ANDing of these two limit switches operates the control relay 4CR. Contact 3CR–2 is connected in parallel with the two limit switches. In the programming, the series elements in the parallel branch are programmed first. The result is then ORed with contact 3CR–2. The address of each of the separate components of FIG. 14 is listed below the component. There are at least two procedures for programming the circuit shown in FIG. 14. First, the first limit switch on the input board is loaded into an accumulator. Then, the condition of the second limit switch is ANDed with the condition of the accumulator. The condition of contact 3CR–2 from the RAM is then ORed with the accumulator to produce the logic results of the control relay 4CR. The condition of relay 4CR is stored in the RAM because 4CR does not control an external output circuit. This condition is then used for generating subsequently normally open or normally closed contacts within the program of the programmable controller. In this manner, any number of subsequent contacts can be controlled by the condition of the control relay 4CR which is stored at address 0.0.0.4 of the RAM. The circuit shown in Example 2 can also be programmed by reversing the order of the limit switches. This is shown in the second program of FIG. 14.

It is not practical or efficient to LDA the contact 3CR–2 first because it is to be ORed with a result, instead of with a single element. If each branch included two or more ANDed contacts or switches, one branch would be processed first and the logic result of this branch would then be stored in the RAM. Then the second branch is processed and ORed with the stored RAM result of the first branch.

The programming Example 3, as shown in FIG. 15, includes a limit switch 1LS connected in series with normally closed contact 4CR–1 to actuate the control relay 5CR. The condition of control relay 4CR, which determines the logic of the normally closed contact 4CR–1, is found at address 0.0.0.4 of the RAM. The condition of the relay 5CR is stored at address 0.0.0.5 in the RAM. Consequently, to program the particular circuit illustrated in FIG. 15, the information at the input circuit corresponding to the limit switch is first loaded (LDA) into the accumulator. The logic at RAM address 0.0.0.4 can not be ANDed with the limit switch because the circuit of Example 3 includes a normally closed contact of the relay 4CR. Consequently, the instruction is CAND. This inverts the condition of the control relay 4CR and then ANDs this condition with the logic of limit switch 1LS in the accumulator. The results of this ANDing is in the accumulator. At the STO statement, this logic is stored at RAM address 0.0.0.5. Consequently, the condition of control relay 4CR is now stored in the RAM at address 0.0.0.5 for subsequent use by a contact controlled with this relay.

The COR function of the programmable controller is illustrated in programming Example 4 of FIG. 16. In this example, the limit switch 2LS is connected in parallel with the normally closed contact 5CR which is controlled by the condition of control relay 5CR of program Example 3 shown in FIG. 15. If the control relay 5CR is energized, the normally closed contacts 5CR of FIG. 16 is opened. The reverse is also true. Consequently, the condition of the RAM at address 0.0.0.5 must be inverted before the contacts can be ORed with the accumulator information corresponding to the condition of limit switch 2LS. Consequently, this is performed by a COR instruction. After the COR instruction, the logic in the accumulator is then stored (STO) at RAM address 0.0.0.6 for subsequent use by contacts controlled in accordance with the condition of control relay 6CR.

The programming examples illustrated in FIGS. 13–16 are representative in nature. They indicate how the various branches of a ladder relay wiring diagram can be programmed by a series of statements to produce the desired output with certain input conditions. Consequently, the programmable controller A performs the functions of the actual wired diagram, although there is no hard wiring conforming to the actual diagram and the number of components and size of the unit is drastically reduced. The program statements continue one after the other until all logic has been processed and the scan of counter 82 is completed. Then the statements are processed again. All atatements are scanned each 0.01 second so that the condition of the input and output circuits appear to be instantaneously responsive to the circuit contained in the series of programmed statements. Other programming steps and the function of various programming features will become more apparent during the detailed description of the preferred embodiment of the present invention.

INSTRUCTION AND LOGIC FUNCTIONS OF CONTROLLER

Figure 17:
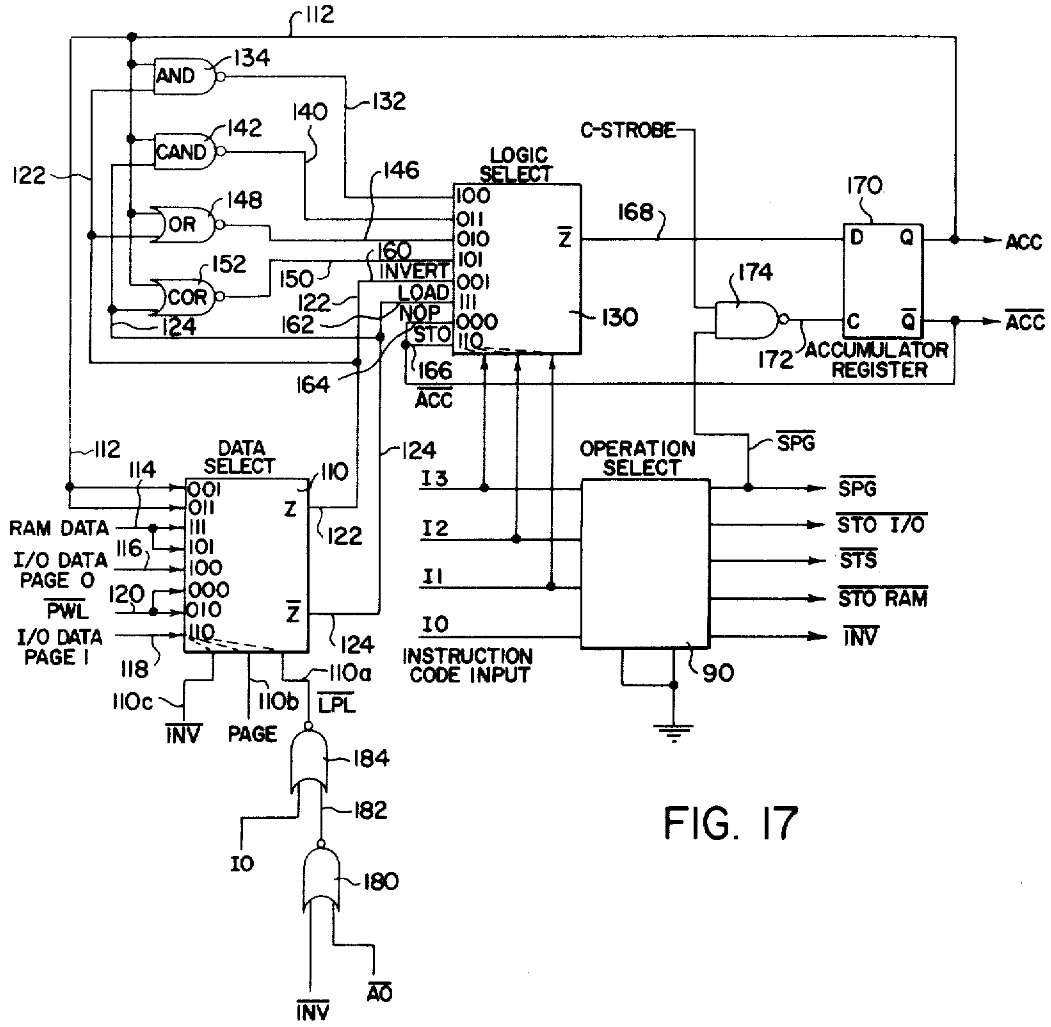
FIG. 17 is a schematic logic diagram illustrating the logic performing function of the programmable controller.

Referring now to FIGS. 9 and 17 the basic logic and instruction portion of controller A is set forth. FIG. 9 indicates the binary logic appearing upon instruction line $I_0$–$I_3$, as they emanate from the read only program memory 50, shown in FIG. 3. Each statement created by the program memory 50 includes an instruction coded into binary language and appearing upon the indicated instruction lines $I_0$–$I_3$, and an address coded into a binary language and appearing on lines $A_0$–$A_7$. Address lines $A_0$, $A_1$ are used with the $I_0$–$I_1$ lines in processing certain instructions such as inversion, page setting, and power latch operations, as shown in FIG. 9. By using these address lines $A_0$, $A_1$, additional instruction or functions can be performed without requiring fifth and sixth instruction lines. This concept will be apparent when the operation of the circuit shown in FIG. 17 is described.

The block diagram illustrated in FIG. 17 represents circuits which are illustrated in more detail in FIGS. 5A–5D. FIG. 17 simplifies the logic and data selecting feature of the controller A and will be of assistance in understanding the total circuitry disclosed in the detailed FIGS. 5A–5D.

Instruction decoder 90 has inputs $I_0$–$I_3$ and outputs designating certain instruction functions, such as SPG, STO I/O, STS, STO RAM and INV. The outputs from the decoder 90 are selected as inverse outputs so that they are normally at a logic 1 and are at a logic 0 only when instruction lines $I_0$–$I_3$ are coded as shown in FIG. 9. In view of this, the outputs of decoder 90 are indicated to be in the inverted logic form.

Incoming data is selected by the data selector 110 having inputs 112, 114, 116, 118 and 120 which are, respectively, the Accumulator Data (ACC), RAM data, I/O Data for $\overline{\text{Page 0}}$, I/O Data for Page 1, and the Power Latch Data $(\overline{\text{PWL}})$. All of this data appears simultaneously at the inputs of the data selector 110. The binary code on control lines 110*a*, 110*b* and 110*c* indicate which data is passed through selector 110. The 3 BIT binary code reproduced adjacent the inputs of selector 110 indicates which data is passed at any given coding of lines 110*a–c*. For instance, if the control lines 110*a*–110*c* have a code of logic 110 as shown by the dashed lines in FIG. 17, the I/O Data from Page 1 is passed through the data selector 110. If the control lines have a code of 001 or 011, the Accumulator Data or logic at input 112 is passed through the data selector 110. Of course, the data appearing on the input/output Data lines or the RAM Data lines is the data at the particular address specified by lines $A_0$–$A_7$ of a given statement. The selector or decoder 110 includes output terminal Z connected to line 122 and output terminal $\overline{Z}$ connected to line 124. Consequently, the logic of line 122 is the same as the selected input data and the logic on line 124 is inverted logic. This feature is used for subsequent logic processing through the logic selector 130. Control line 110*a* includes a NOR gate 180 having, as inputs, $\overline{INV}$ and $\overline{A_0}$. The output 182 of this NOR gate is one of the inputs to a second NOR gate 184. The second input is instruction line I/O. The function of this input circuit will be discussed with the invert and power latch instructions of the controller.

Referring now more particularly to the logic selector 130, it includes inputs 132 connected to a NAND gate 134, input 140 connected to NAND gate 142, input 146 connected to NOR gate 148, and input 150 connected to NOR gate 152. These inputs produce the logic functions of AND, CAND, OR and COR, respectively. The logic selector 130 also includes inputs 160, 162, 164 and 166 to perform the instructions indicated by the labels on these particular lines. For instance, line or input 160 is the invert instruction input line.

The output of logic selector 130 is line 168 which is connected to the D terminal of a D flip-flop 170 which is the 1 digit accumulator register of programmable controller A. The logic in this accumulator register, or flip-flop 170 is the logic used for the function of the controller A. In accordance with normal practice, the accumulator register, or flip-flop, 170 includes a Q terminal and a $\overline{Q}$ terminal. For simplicity, FIG. 17 illustrates the Q terminal as being connected to line 112 to produce an accumulator (ACC) reading and the lines 164, 166 are connected to the $\overline{Q}$ terminal to produce an inverted reading ($\overline{ACC}$) of the accumulator 170. In the preferred embodiment of the invention as shown in FIG. 5B, there are certain logic gates between the Q and $\overline{Q}$ terminals to produce the inverted and non-inverted outputs for the accumulator. Accumulator 170 includes a clock terminal C connected to line 172 which is controlled by the NAND gates 174 having the C-STROBE as one input and the logic on the Set Page line ($\overline{SPG}$) of decoder 90 as the second input. As will be explained later, the C-STROBE is a logic 1 pulse that appears at a set time during each new statement. This strobe updates the total circuits of controller A. When this strobe occurs the accumulator 170 is clocked, as the C-STROBE shifts from logic 1 to logic 0, to transfer the D logic to the Q output terminal of the accumulator. Of course, the inverted logic appears at the $\overline{Q}$ terminal. As long as there is no instruction to Set Page, NAND gate 174 operates essentially as an inverter for the C-STROBE.

LOAD (LDA) I/O FUNCTION

When the statement from the program memory 50 includes an instruction having a code of logic 1111, the I/O Data addressed by the logic on line $A_0$–$A_7$ is loaded into the accumulator 170. Assuming that the page being processed at this portion of the program is Page 0, a logic 0 appears on control line 110*b* of the data selector 110. A logic 1 appears in the $\overline{INV}$ line because there is no invert instruction. Thus, a logic 0 appears in input line 182 of NOR gate 184. However, the logic on line $I_0$ is logic 1 as found in FIG. 9. Consequently, the output of NOR gate 184 is latched to a logic 0 which appears in control line 110*a*. Since there is no invert instruction, a logic 1 also appears in control line 110*c*. Reviewing the control line logic, it is 100, reading 110*c* to 110*a*. This then actuates input line 116 to pass I/O Data from Page 0 to line 122. The inverse logic appears in line 124 which is connected to input 162 of the load line for logic selector 130. The logic of line $I_1$–$I_3$ is 111; therefore, the logic on line 162 is passed, in inverted form, to output line 168 to the D terminal of accumulator 170. After these functions have been performed, the C-STROBE clocks the flip-flop 170 to produce the logic in the accumulator 170. Reviewing the results of this process, logic on line 116 was inverted to line 124, was again inverted by logic selector 130 to appear as the non-inverted form in the accumulator. Consequently, when the accumulator is clocked, the I/O Data on Page 0 has been loaded (LDA) into the accumulator 170. The data can be either input or output data according to the external circuit addressed by the load (LDA) statement. In a program, th load (LDA) function is the first logic function of any series of statements to be processed.

LOAD (LDA) RAM FUNCTION

The instruction code for loading (LDA) the RAM data into the accumulator is 1110 as found in FIG. 9. A logic 0 is present on instruction line $I_0$ and the $\overline{INV}$ line is at a logic 1; therefore, both the inputs to NOR gate 184 are logic 0. This produces a logic 1 output in control line 110*a* of data selector 110. The other lines 110*b*, 110*c* have not changed from the previous loading operation; therefore, the data selector is coded 101 and passes the logic from the input line 114 to the output line 122. It is noted that the line 114 has two separate terminals which differ by the logic on PAGE line 110*b*. A particular page of the RAM data is controlled by the logic on the PAGE line which enables one of the two pages of the RAM, at the RAM. Consequently, as long as line 110*a* and line 110*c* are logic 1, the RAM Data is passed to the output line 122. The inverted form of this data appears in line 124 which is also directed to the input 162 of logic selector 130. As previously described, the appearance of logic 111 on lines $I_1$–$I_3$ pass the inverted form of the logic on line 162 to the line 168. The C-STROBE then clocks this information into the accumulator 170. Consequently, the RAM Data on line 114 is loaded into the accumulator in accordance with the logic on instruction lines $I_0$–$I_3$.

STORE (STO) I/O AND STORE (STO) RAM FUNCTIONS

The store (STO) functions of controller A store the logic in the accumulator at an addressed output circuit or at an addressed RAM location. When the logic on instruction lines $I_3$–$I_0$ is 1101, a logic 0 appears on the output line of decoder 90 at $\overline{STO\ I/O}$, as found in FIG. 9. This enables an O-STROBE which triggers the addressed output circuit in the output module 70, in a manner to be described later. In a similar manner, if the logic on line $I_3$–$I_0$ is 1100, a logic 0 is created in the $\overline{STO\ RAM}$ line of decoder 90. This creates a RAM STROBE which opens the RAM 42 to accept, at the addressed location, the data appearing in the accumulator 170.

AND I/O FUNCTION

When the logic on the instruction lines $I_3$–$I_0$ is 1001, the information within accumulator A is ANDed with the address information from an input or output module 60, 70. Again, instruction line $I_0$ is at logic 1. This produces a logic 0 in control line 110*a* of data selector 110. Since there is no invert instruction (INV), a logic 1 appears at control line 110*c*. The logic on control line

110*b* determines only the page from which the input or output data is selected. Consequently, the data of the addressed input or output circuit appears on output line 122, which is directed to the input of NAND gate 134. Another input to this NAND gate is line 112 which has the logic of the accumulator 170. The logic on lines 112, 122 is then ANDed and inverted by the NAND gate 134 and appears on input line 132 of the logic selector 130. Since the code on lines $I_3$–$I_1$ is 100, the inverted form of the logic on line 132 appears at line 168. This logic is then clocked into the accumulator 170 by a C-STROBE at NAND gate 174. The double inversion by NAND gate 134 and selector 130 assures that the non-inverted form of the AND function appears within the accumulator 170.

AND RAM FUNCTION

The logic on instruction line $I_3$–$I_0$ for the AND RAM function only changes the logic of line $I_0$ from logic 1 to logic 0. This produces a logic 1 in control line 110*a.* Consequently, the selector 110 passes the RAM Data of line 114 to line 122. This data is then ANDed with the accumulator data on line 112 to produce the AND function in accordance with the description of the AND I/O function.

OR FUNCTION

For the OR function of the controller, the instruction lines $I_3$–$I_1$ have a logic 010. This then gates the inverted form of the information on line 146 to output line 168. When the OR function is to be performed on I/O Data, instruction line $I_0$ is at logic 1. This latches the output of NOR gate 184, i.e. line 110*a,* to a logic 0 while control line 110*c* is at logic 1. This passes either Page 1 or Page 0 I/O data to line 122. This information is then ORed with the accumulator information by NOR gate 148 and is inverted by this gate before it appears in input line 146. As previously mentioned, the selector 130 passes this information, in inverted form, to the D terminal of accumulator 170. When RAM data is to be ORed, a logic 0 appears in instruction line $I_0$. This places a logic 1 at the output of NOR gate 184 and in control line 110*a.* Thus, data selector 110 passes the data of line 114 to line 122. Beyond that, the function of the circuitry in FIG. 17 is the same as that discussed with respect to the OR I/O function.

SET PAGE FUNCTION

When the logic on the instruction lines $I_3$–$I_0$ is 0011, a set page signal ($\overline{SPG}$) of a logic 0 is created by instruction decoder 90. As shown in FIG. 17, this inhibits the clocking NAND gate 174 of the accumulator 170; therefore, the accumulator remains in its prior condition when the C-STROBE is created. Line $\overline{SPG}$ clocks a separate flip-flop shown in FIG. 5B, to insert the logic of $\overline{A_0}$ into the flip-flop. This will control the page of subsequent statements until a new page change instruction is provided. When a logic 0 appears on $A_0$ at the same time as the Set Page instruction (SPG) is received, $\overline{A_0}$ is logic 1 and the page is set to page 0. In a similar manner, if a logic 1 appears on $A_0$, the page is set page 1. It is noted that the logic on the selector 130 at INVERT corresponds to the Set Page instruction code for lines $I_3$–$I_1$; therefore, this selector will operate on any data in line 122. This logic will be from an addressed I/O circuit. However, this does not affect the logic in the accumulator 170 because the $\overline{SPG}$ line is logic 0, which inhibits NAND gate 174 so the accumulator can not be clocked. Consequently, the accumulator logic is not lost when a page change is made.

INVERT FUNCTION

When the logic on instruction line $I_3$–$I_0$ is 0010, a logic 0 appears in the output line of decoder 90 which is labeled $\overline{INV}$. If the logic 0 also appears in address lines $A_0$, $A_1$, the circuitry of FIG. 17 inverts the logic of the accumulator. Since $\overline{INV}$ is logic 0 and $\overline{A_0}$ is logic 1, NOR gate 180 has a logic 0 output at line 182. Line $I_0$ is also logic 0; therefore, the output of NOR gate 184 at line 110*a* is logic 1. This allows the logic on ACC line 112 to appear at output line 122 of data selector 110. This transfers the non-inverted form of the accumulator logic to the input line 160 of logic selector 130. Since logic 001 appears on instruction line $I_3$–$I_1$, the logic of line 160 is inverted and appears in line 168. The C-STROBE then clocks the inverted logic into the accumulator. This inverts the logic of the accumulator.

The logic 0, that appears on address line $A_1$ and $A_0$ when the invert function is to be performed, are used to inhibit the processing of the power latch functions which use the same $I_0$–$I_3$ logic. This feature will be described with the power latch circuit best shown in FIG. 5A.

POWER LATCH FUNCTIONS

As found in FIG. 9, when the instruction logic is coded to produce an invert function, the address lines $A_0$, $A_1$ are used as additional coding to control various functions of the power latch of the preferred embodiment of the present invention. These functions are LDA PWR LATCH, STO PWR LATCH, and STO PWR LATCH and INV. These functions require the description of the power latch and its operation in the programmable controller as will be disclosed during the description of FIG. 5A. Basically, the load power latch function gates the data from the power latch into the accumulator to determine if there has been a power interruption. The STO POWER LATCH function gates the accumulator information into the power latch when the accumulator data is a logic 1 and at the C-STROBE. The STO POWER LATCH and INV is the same as the STO POWER LATCH, except that the accumulator logic is inverted after the original accumulator data has been gated into the power latch circuit. The SPL function sets the power latch to sense a subsequent power failure or interruption.

CAND FUNCTION

When the logic instruction line $I_3$–$I_1$ is 011, the CAND function is performed by logic selector 130. This coding of the instruction lines gates the inverted form of the logic on line 140 to line 168. Thereafter, a C-STROBE clocks the logic into the accumulator 170. Since the $\overline{INV}$ line is at logic 1, there is a logic 1 at control line 110*c* of data selector 110. There is also a logic 0 in line 182 which unlatches NOR gate 184 for operation by instruction line $I_0$. When the CAND function is to be performed with I/O Data, the instruction line $I_0$ has a logic 1. This produces a logic 0 at the output 110*a* of NOR gate 184. Consequently, either input line 116 or input line 118 is to be gated through the data selector 110. If Page 0 is selected, the logic of the control lines 110*c,* 110*d,* 110*a,* respectively is 100. Consequently, the data in line 116 is transferred to line 122. The inverted data is gated to line 124. This inverted data is directed to the input of NAND gate 142 where it can be ANDed with the accumulator logic on line 112 and then inverted to produce a logic in line 140. This logic is inverted by the selector 130 before being gated to the line 168. This produces an inversion of the data and then an ANDing of the data. The inversion by the NAND gate 142 is cancelled by the inversion of the selector 130.

To CAND the RAM Data, the logic on line $I_0$ is logic 0. This shifts the logic of line 110*a* to a logic 1. Consequently, the addressed RAM data at line 114 is gated, in inverted form to line 124. Thereafter, this logic is directed to the NAND gate 142 for processing as previously indicated.

COR FUNCTION

When the logic on instruction line $I_3$–$I_1$ is 101, the COR function is performed. As in the CAND function, when a 1 appears on the $I_0$ line, the I/O Data is CORed. When a logic 0 appears at instruction line $I_0$, the RAM Data is CORed. This data is first inverted by the data selector 110 and appears in line 124 which is directed to the input of NOR gate 152. This gate ORs the inverted data with the accumulator data on line 112. Then the result is inverted before appearing at input line 150 of logic selector 130. The logic on line $I_3$–$I_1$ gates the data from line 150 to line 168, in its inverted form. Again, the double inversion by the NOR gate 152 and the logic selector 130 cancel each other out so that the COR function is performed and directed to the D terminal of accumulator 170.

STORE SEIPP FUNCTION

At the STORE SEIPP instruction, data from the accumulator is gated to the Seipp register after a C-STROBE. The Seipp register then functions in a manner to be described later in a section devoted to this register. Basically, the Seipp register inhibits certain store (STO) functions to provide a skip in the program. To produce $\overline{\text{the}}$ STORE SEIPP signal, which is a logic 0 in the line $\overline{STS}$ at the output side of decoder 90, the instruction lines $I_3$–$I_0$ have a binary logic 0001.

NO OPERATION FUNCTION

To cancel out a programmed statement, an instruction is rewritten as a logic 0000 on instruction line $I_3$–$I_0$. This actuates the input at line 164 of logic selector 130. Consequently, $\overline{ACC}$ is gated through the selector which converts it to the logic of ACC. Consequently, the NOP instruction merely gates back to the accumulator the logic appearing in the accumulator.

INFORMATION LINES AND BASIC STROBES

The controller A includes a number of information lines and basic strobes, the function and general use of these lines and strobes will be helpful in considering the detailed description of the various circuitry used in the preferred embodiment of the present invention.

Figure 5C:
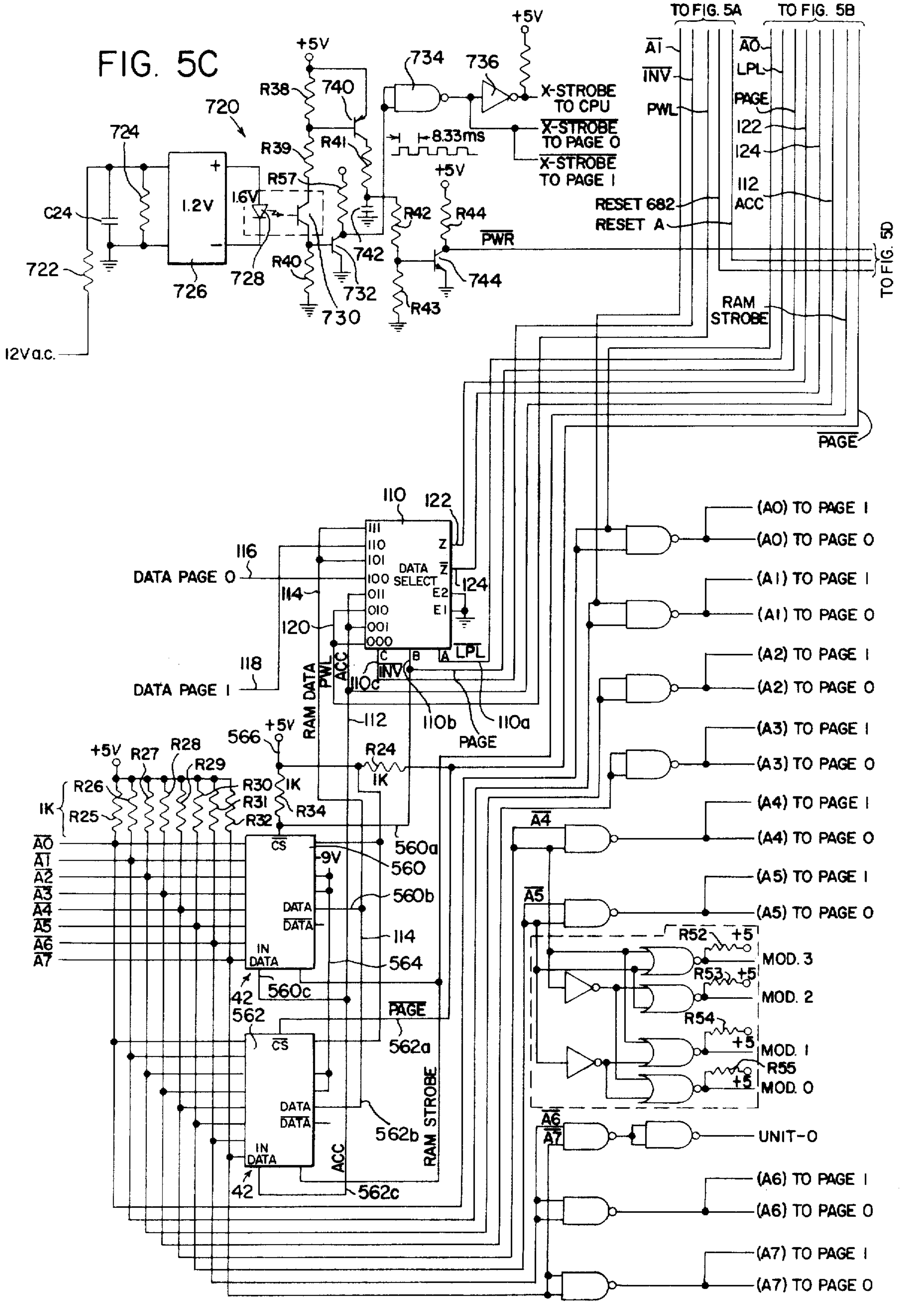
Figure 5D:
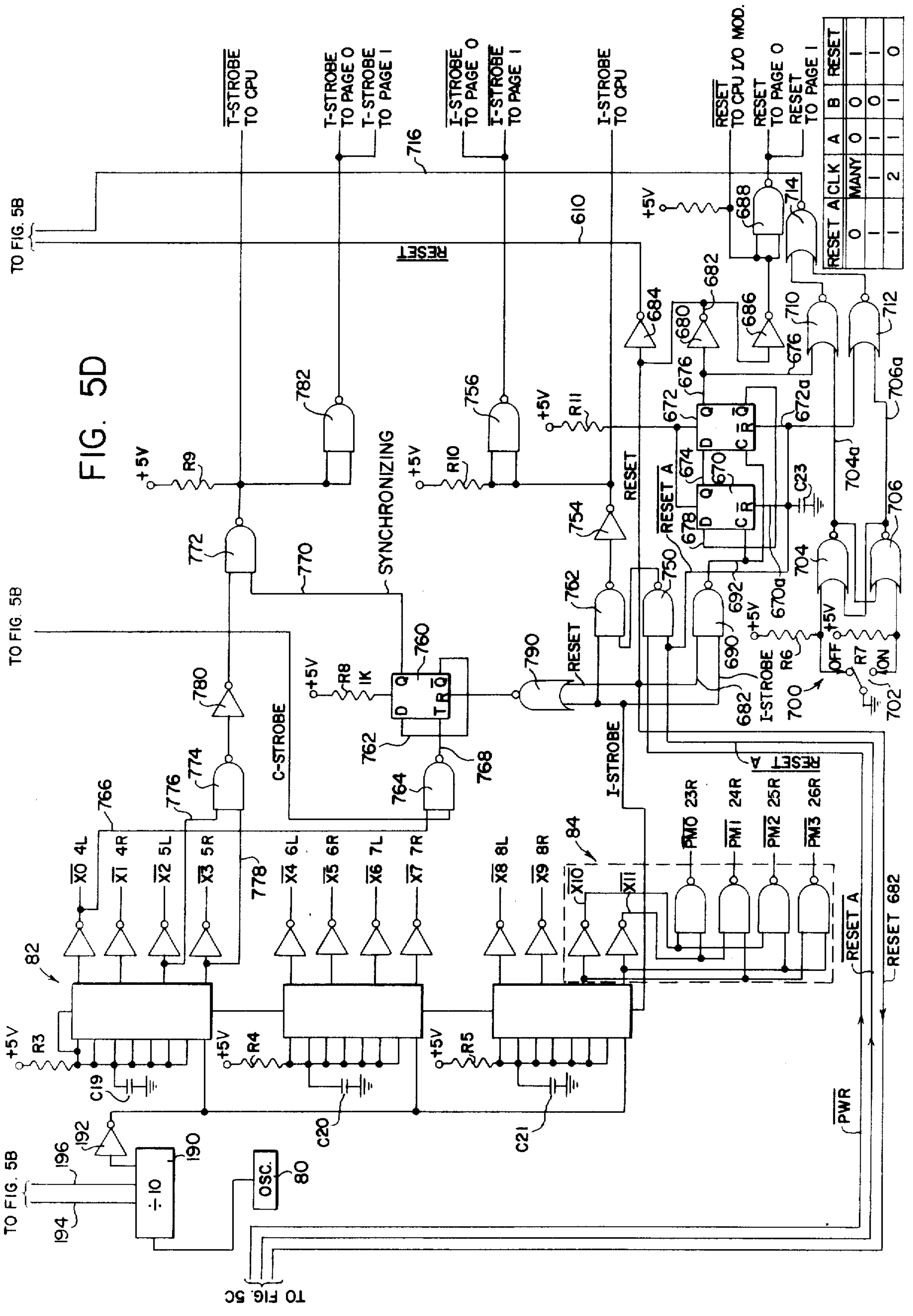

As shown in FIGS. 3 and 5D, lines $X_0$–$X_9$ are created by the statement counter 82 which is driven by oscillator 80 through a divide by ten counter 190 and an inverter 192. These are directed to the read only program memory 50, shown in detail in FIGS. 6A, 6B, to advance the statements coming from the program memory 50 for use by the remainder of the circuitry.

Lines $X_{10}$–$X_{11}$ are also created by the statement counter 82; however, they are directed to the memory decoder 84, as shown in FIGS. 3 and 5D. These two lines provide a means of energizing one of the four memory select lines $PM_0$–$PM_3$ which are, in turn, directed to the read only program memory 50 to select one of four different modules used in this memory. It is appreciated that in some smaller installations, less than four modules are used; therefore, less than all of the program select lines may be used.

A module is read only program memory 50, when receiving a particular code in lines $X_0$–$X_9$ and being selected by one of the program memory select lines $PM_0$–$PM_3$, creates a statement. The first part of this statement includes four bits of information on lines $I_0$–$I_3$. These lines are connected to the instruction decoder 90, shown in FIGS. 5B and 17. The purpose of these lines has been described. In addition, the memory 50 creates address lines $A_0$–$A_7$ which are used in the input circuit of FIG. 7 and the output circuit of FIG. 8, as well as in the random access memory 42, best shown in FIG. 5C.

The control strobe, C-STROBE, is generated by the counter 190 through lines 194, 196 connected to the input of a NAND gate 200, shown in FIG. 5B, which produces the inverted form of the C-STROBE. Inverters 202, 204 invert the output of NAND gate 200 to create the C-STROBE. This strobe is a logic 0 pulse occurring 1.464 $\mu$sec after each statement number change. The strobe lasts for 0.488 $\mu$sec. As will be explained later, all operations controlled by the C-STROBE are executed upon the falling edge of the strobe which is 1.952 $\mu$sec after the statement change has been made. The only exception to this strobing is during the strobe of RAM 42, which is executed when the C-STROBE is at a logic 1 level.

Figures 8, 23:
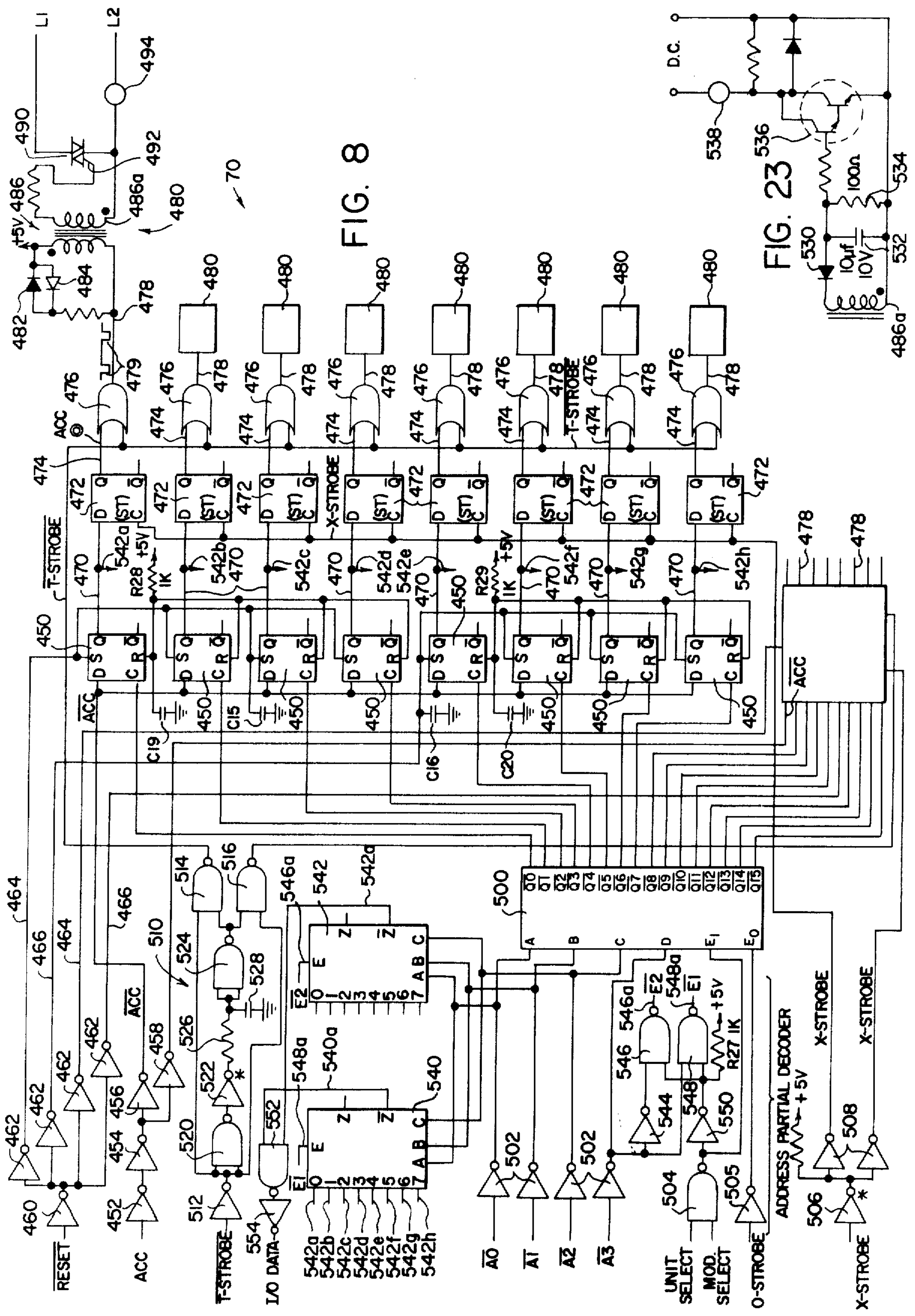
FIG. 8 is a schematic wiring and block diagram illustrating the output circuit incorporated into the preferred embodiment of the present invention.
FIG. 23 is a wiring diagram illustrating a D.C. output which can be used in the preferred embodiment of the present invention.

The output or O-STROBE is a logic 1 pulse lasting the same duration as the C-STROBE pulse. This output strobe occurs whenever a storing (STO) function is being executed to an I/O address. The O-STROBE is connected to tthe output module, as shown in FIG. 8 and schematically shown in FIG. 4.

The input strobe, or I-STROBE, is a logic 1 pulse which occurs every 10 msec for 2.44 $\mu$sec during the last statement of the statement counter. This statement is numbered 4095, since the first statement is Number 0. Consequently, the I-STROBE appears once during each scan of the program within the program memory 50. The I-STROBE is also controlled by the B+ supply and the power monitor circuits for purposes to be described in connection with the functions of these units. Input logic is stored in the input modules when an I-STROBE is created, as schematically illustrated in FIG. 1C.

So that the triacs in the output circuit are turned on when the line voltage is at the zero crossing point, there is provided an X-STROBE, which causes a change in the status of output circuits at the zero crossing of the supply voltage.

The triac strobe, or T-STROBE, is a logic 1 pulse of 4.88 $\mu$sec duration occurring every 39.04 $\mu$sec. This pulse is synchronized by a circuit to be explained so that its trailing edge occurs conincidentally with the trailing edge of the C-STROBE. In this manner, a triac gate receives a minimum gating pulse of at least 2.44 $\mu$sec at its initial turn on. The X-STROBE could be used to turn on a triac in an output circuit. This could be used as an alternative to the T-STROBE. When the output circuit is D.C., the T-STROBE function is preferred.

The details in the creation of the strobe discussed above will become apparent from the description of the circuitry for generating these strobes and for using the strobes for logic processing in the programmable controller A.

READ ONLY PROGRAM MEMORY

Figure 6A:
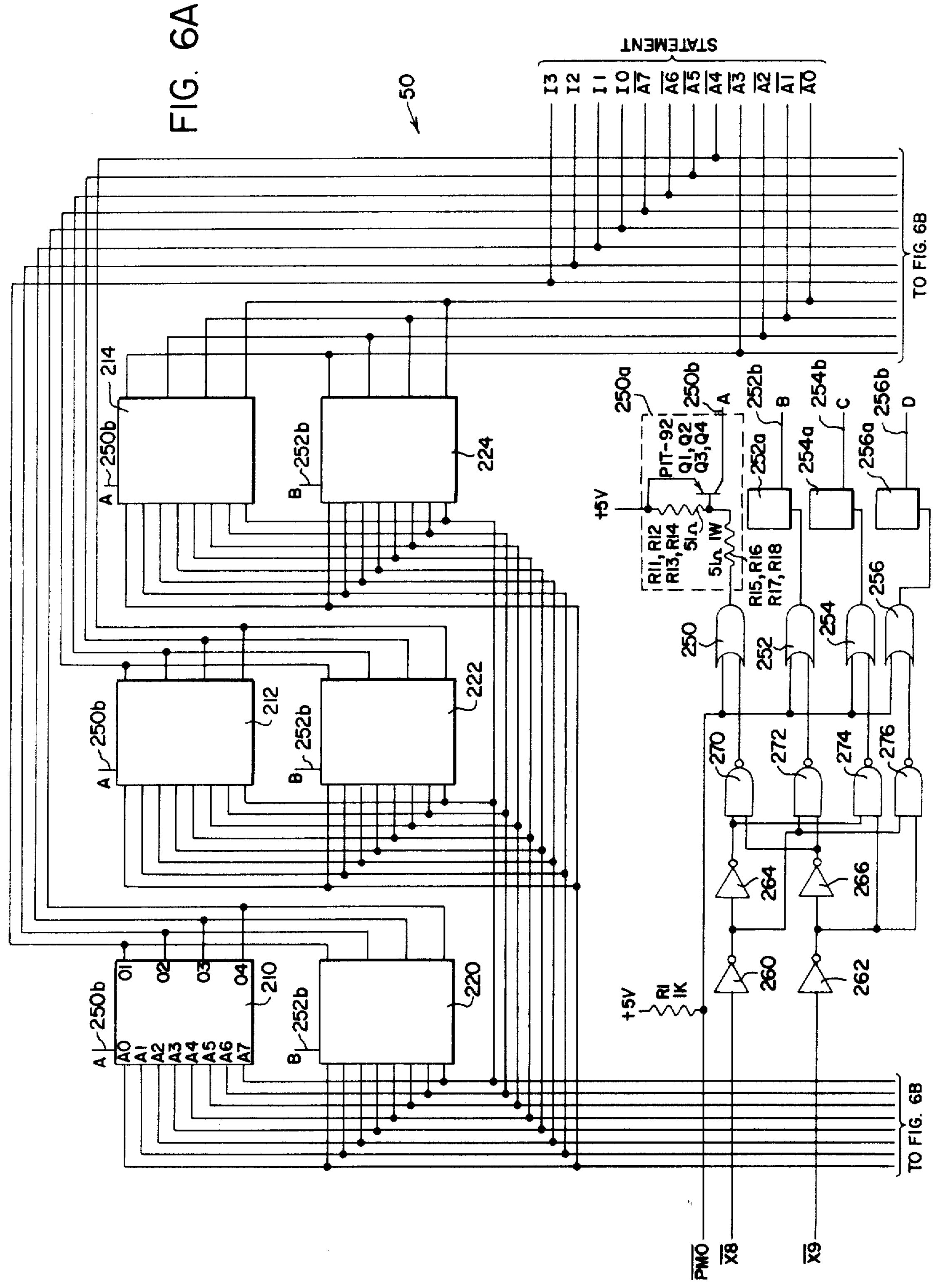
FIG. 6 is a wiring diagram and logic diagram for the read only memory used in the preferred embodiment of the present invention and divided into separate views labeled FIGS. 6A, 6B.
Figure 6B:
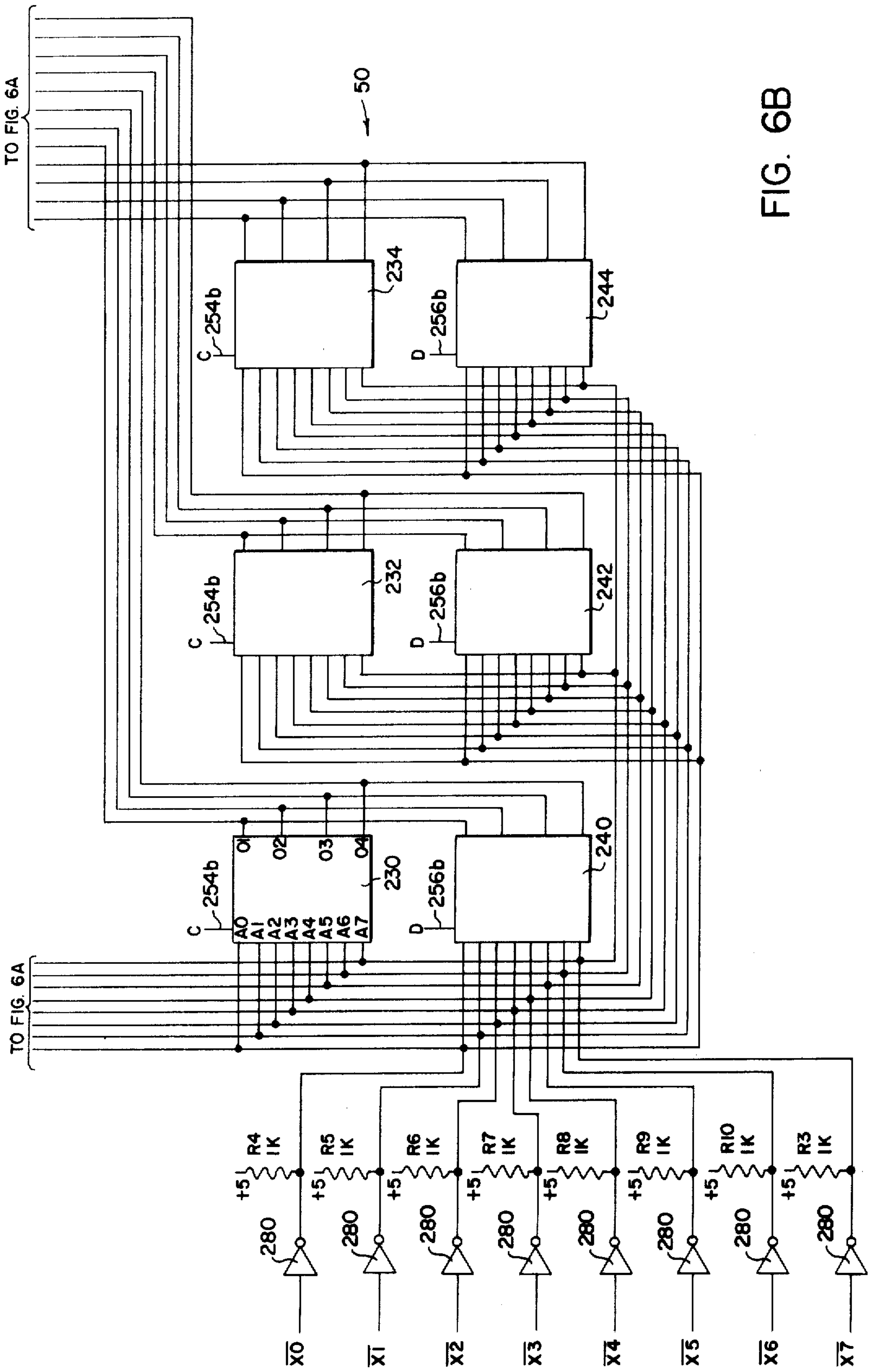

The program memory 50 is best shown in FIGS. 6A and 6B. In the preferred embodiment of the present invention, the program memory 50 includes four separate and distinct modules, only one of which is shown in FIGS. 6A, 6B. The other memory modules operate substantially identical to the disclosed module and are selected by one of the four program select lines $PM_0$–$PM_3$. The memory module includes four sets of integrated circuits 210, 212, 214 which form the A sets, 220, 222, 224 which form the B set, 230, 232, 234 which form the C set and 240, 242, 244 which form the D set. These read only memory integrated circuits each includes 1,024 fusable links formed by the standard fusable link technology. Consequently, according to the input logic on the eight input lines $X_0$–$X_7$ a four bit word can be created at the output of each of the integrated circuits. Because there are eight inputs, 256 different locations can be addressed within each of the memory integrated circuits to produce four outputs at each circuit. When considering that each of the sets includes three integrated circuits, this creates 256 12 bit output words per set. The module shown in FIGS. 6A, 6B includes four sets; therefore, this module has a capacity to create 1,024 different statements each including 12 bits of information. Each statement includes four instruction lines $I_0$–$I_3$ and eight address lines $A_0$–$A_7$.

In operation, the logic 0 on the $PM_0$ lines, assuming that this is the program select line for the module shown in FIGS. 6A, 6B, enables the module to the exclusion of the other three modules in the total program memory 50. The logic on lines $\overline{X_8}$ and $\overline{X_9}$ selects one of the sets A, B, C or D and the logic on lines $\overline{X_0}$ to $\overline{X_7}$ addresses the particular location in each of the three integrated circuits forming the particular set being used. The inverted form of $X_0$–$X_9$ is shown because the logic of these lines is the inverse binary representation of the desired statement number to be employed. This is not important to the understanding of the invention, since the logic on the lines $X_0$–$X_9$ is intended only to read the particular addresses of the module in the order dictated by the program counter 82. The statements are selected in a set order which does not change irrespective of the program of controller A. The program, which is inserted into the integrated circuits in a manner not germane to the present invention, causes statements to issue from the program memory in the set order of programming to perform the logic for which the programmable controller has been programmed. This programmed logic changes from application to application.

Referring now in more detail to the circuitry of FIGS. 6A, 6B. If a logic 1 appears at line $PM_0$, OR gates 250, 252, 254 and 256 are each latched with a logic 1 output. This inhibits circuits 250*a*, 252*a*, 254*a*, 256*a* to cause the line 250*b*, 252*b*, 254*b*, 256*b* to not activate any of the integrated circuit memories of the illustrated module. A logic 0 on line $\overline{PM_0}$ unlatches each of the OR gates 250–256. In this manner, the OR gates 250-256 become active and are controlled by the logic appearing on line $\overline{X_8}$, $\overline{X_9}$. For the purpose of illustration, assume that the program counter 82 produces a logic 1 at both lines $\overline{X_8}$ and $\overline{X_9}$. This produces a logic 0 output for inverters 260, 262 and a logic 1 output for inverters 264, 266. This produces a logic 1 at both inputs of NAND gate 270. At least one of the inputs of the other NAND gates 272, 274 and 276 will have a logic 0. Consequently, the output of NAND gate 270 is a logic 0. The outputs of the other NAND gates are a logic 1. The logic 1 from the other NAND gate produces logic 1 at the outputs of NOR gates 253, 254, and 256. The output of NOR gate 250 is a logic 0 which grounds circuit 250*a* and enables line 250*b*. This line activates integrated circuits 210, 212 and 214 of set A. Lines $\overline{X_0}$–$\overline{X_7}$ are inverted by inverters 280 and are connected to the inputs of all integrated circuit memory units shown in FIGS. 6A and 6B. Since only integrated circuits 210, 212 and 214 are energized, these three circuits produce the output logic on line $I_0$–$I_3$ and $A_0$–$A_7$. Integrated circuits 210, 212 and 214 can create 256 statements. By changing the logic on lines $\overline{X_8}$ and $\overline{X_9}$, a different set of integrated circuits is enabled. Consequently, in module shown, 1,024 separate and distinct statements can be created. If more statements than this are required, a second memory module is used and is enabled by producing a logic 0 on the memory enabling or selecting line PM for the second module. This selection process is continued from one program memory module to the next. Regardless of the number of memory modules used, the program scan time remains 0.01 seconds because the statement counter 82 counts through 4,096 increments before recycling. The use of a fewer number of memory modules does not affect this counting operation. With four modules having 12 integrated circuits, it would require approximately 6 amperes to drive all memory circuits. By activating only three circuits at a time, the power requirements can be reduced by a factor of sixteen.

INPUT CIRCUIT

Figure 7:
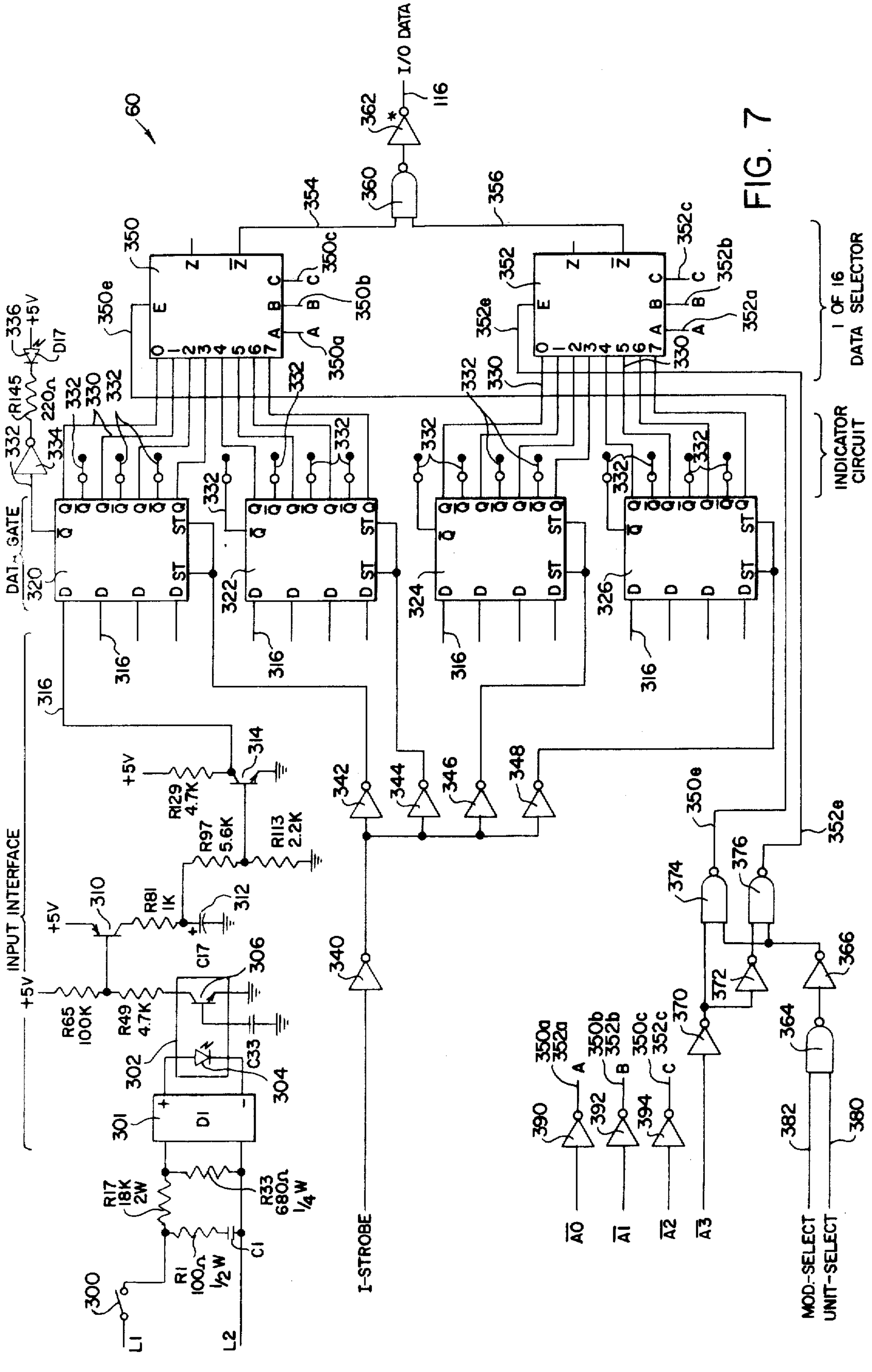
FIG. 7 is a schematic wiring and block diagram illustrating certain aspects of the input circuits for the controller constructed in accordance with the preferred embodiment of the present invention.

The input circuit or module 60 is shown in detail in FIG. 7. For simplicity, only a single input, represented as a switch 300 across 120 volt lines $L_1$, $L_2$ is illustrated. The fifteen additional inputs are identical in operation and structure; however, they may be limit switches or other devices for connecting input circuits, as shown in FIG. 7. The switch 300 is only representative in nature. When the switch is closed, indicating that this particular input is actuated, rectifier 301 energizes the photoresponsive coupler 302. This type of coupler is well known in the art and generally includes a LED 304 which is pulsed by the rectifier 301 and a photoresponsive transistor 306. Transistor 306 pulses transistor 310 if the input circuit is energized. A filter capacitor 312 is placed between the transistor 310 and a control transistor 314 having an output line 316. The capacitor creates a turn on voltage for transistor 314 when the LED 304 is pulsing. With transistor 314 conducting, the corresponding input lines 316 is grounded. Consequently, a logic 0 on one of the lines 316 indicates that the input circuit associated with this particular input line 316, is energized.

To prevent low voltage false signals from actuating the LED 304, there is provided a voltage divider including resistors R17, R33, as shown in FIG. 7. The voltage across lines $L_1$, $L_2$ must be sufficiently high to create, across resistor R33, a voltage high enough to actuate rectifier 301 and LED 304. Thus, the line voltage need be about 70 voltage peak to operate the input circuit. Resistors R17, R33 are selected so that the voltage across resistor R33 is sufficient to drive the LED for a given input voltage across lines $L_1$, $L_2$. By using this concept, the threshold voltage can be varied by changing the resistor to allow operation by various levels of A.C. and D.C. voltage across lines $L_1$, $L_2$. Resistor R1 and capacitor C1 are used to create currents for assisting in keeping the contacts of switch 300 clean.

Figure 18:
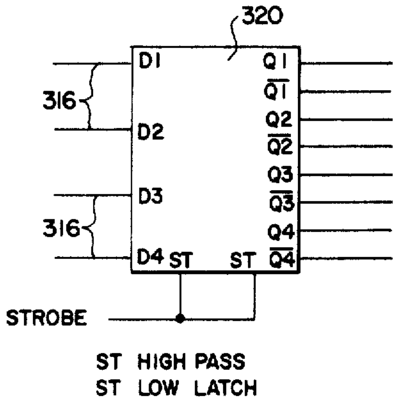
FIG. 18 is a schematic representation of the logic latch used in the preferred embodiment of the present invention.

Input lines 316 from each of the sixteen inputs of the module illustrated in FIG. 7 are connected to D terminals of one of the bi-stable latches 320, 322, 324, 326. The bi-stable latch 320 is illustrated in more detail in FIG. 18. When the strobe terminals ST receive a logic 1, the binary data on each of the lines 316 is transferred directly to an associated Q output. The inverse of this data appears on the associated $\overline{Q}$ output. Assuming that the clock has received a logic 1, the logic 1 on the line 316 connected to input terminal D1 will produce a logic 1 at the Q1 terminal. At the $\overline{Q}1$ terminal a logic 0 appears. The data from the other D terminals is also transferred at the clocking pulse to the corresponding output Q and $\overline{Q}$ terminals. In other words, all of the information on the input terminals, i.e. line 316, is transmitted to the output terminals. If the data on the input terminals should change while there is a high logic, clock pulse, the logic on the associated output terminals will also change. When the clock terminal shifts to a low logic, i.e. logic 0, the data in the output terminals is latched. It can not change irrespective of changes in the input logic conditions. Consequently, the bi-stable latch 320 holds the output terminals to a condition existing at a certain time when the clock pulse shifts from logic 1 to logic 0.

The function of bi-stable latch 320 and its associated circuitry will be described, and this description will apply to the other bi-stable latches 322, 324 and 326 of the module illustrated in FIG. 7. The function of the Q output lines 330 and the $\overline{Q}$ output lines 332 for latch 320 are identical. For this reason, only the circuitry associated with one of the $\overline{Q}$ lines 332 is illustrated. It is appreciated that all other lines 332 have the same circuitry. An inverter 334 inverts the logic on the $\overline{Q}$ line 332 and applies it to a lighting circui including a LED 336 and resistor R145. A logic 0 in line 316 indicates that the switch 300 has been closed. When this happens, the $\overline{Q}$ line 332 is driven to a logic 1; therefore, the output of inverter 334 is logic 0. This grounds the LED 336 through resistor R134, which causes the LED to light. This light is exhibited on a panel of the programmable controller A in a manner to indicate that the input circuit containing switch 300 is activated. If switch 300 is opened, a logic 1 appears in line 316. This places a logic 0 in line 332 and extinguishes the LED 336. The other $\overline{Q}$ line 332s have similar lighting circuits.

The clocking or ST terminals of the bi-stable latches 320–326 are controlled by the I-STROBE, which is inverted by inverter 340. Thereafter, before being directed to the clock terminals, the I-STROBE is again inverted by separate inverters 342–348. Consequently, the I-STROBE appears in its non-inverted form at the clocking terminals of the bi-stable latches 320–326. As previously mentioned, the I-STROBE is a short duration logic 1 occurring every 10 msec at statement No. 4095 of the program memory. At this last statement of the program memory an I-STROBE appears at the clocking or ST terminals of the bi-stable latches. This causes the Q terminals to follow logic of the input lines 316. As soon as the I-STROBE disappears, the latches are latched so that changes in the input logic has no effect on the output logic.

The LED 336 displays the condition of a selected input circuit and remains energized during the program scan until the last statement of the program memory. The data on Q line 330 of latches 320–326 also remains fixed during the program scan. In this manner, changes in the input logic is not directed to the logic processing circuitry of controller A at any time, other than at the end of a scanning cycle. The LEDs 336 accurately indicate input logic being provided to the logic circuitry. If the indicator light, or LED, were on the input side of the bi-stable latches, the light would not necessarily indicate the logic being processed by the controller. It would only indicate the apparent condition of individual input circuits.

Figure 19:
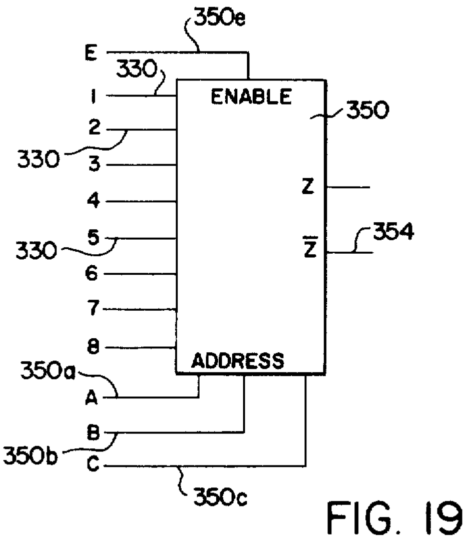
FIG. 19 is a schematic representation of 1–8 selector and its truth table as used in the preferred embodiment of the present invention.

Logic or data from all input circuits of an input module appears in lines 330 which are connected to the input terminals of selectors 350, 352. Since each bi-stable latch has four outputs 330, the eight input selectors 350, 352 can process the outputs of two latches. The function of the selectors 350, 352 is shown graphically in FIG. 19. Each of the selectors has an enabling line 350*e* or 352*e*. A logic 0 in the enabling lines allows the selectors to operate in accordance with the truth table in FIG. 19. A logic 1 on the enabling lines 350*e*, 352*e* latches the selectors to create a logic 1 output at the $\overline{Z}$ terminal. These selectors are decoding devices which are responsive to control lines 350*a*, 350*b*, 350*c* for selector 350 and control lines 352*a*, 352*b*, 352*c* for selector 352. The selected data is transferred in inverted form to the $\overline{Z}$ terminals connected to output lines 354, 356, respectively. These output lines are, in turn, directed to NAND gate 360 having an output connected to the input side of inverter 362. The asterisk adjacent inverter 362, and adjacent any other gate, indicates an open collector gate output. The I/O data for use in controller A is created at the output of this inverter.

Figure 20:
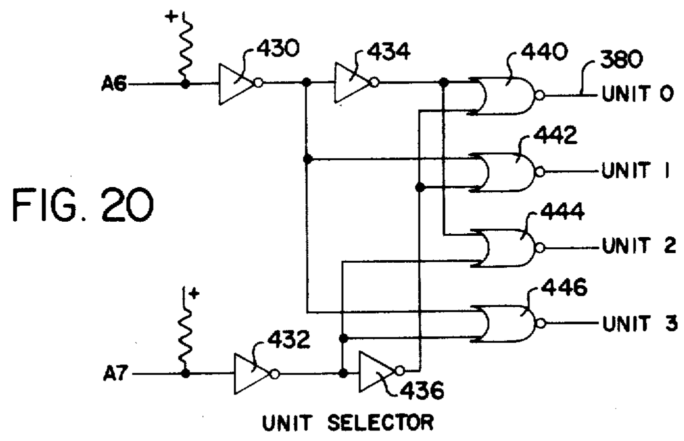
FIG. 20 is a logic diagram illustrating a representative decoder which can be used in the preferred embodiment of the present invention.

The logic on address $\overline{A_3}$ is decoded to energize either selector 350 or selector 352. Various arrangements could be used for this purpose; however, in accordance with the illustrated embodiment of the invention, the logic on line $\overline{A_3}$ is inverted by inverter 370 and then inverted by inverter 372. This produces opposite logic to the input side of NAND gates 374, 376 having outputs connected to enabling lines 350*e* and 352*e*. In this manner, the logic in line $A_3$ selects either the selector 350 or the selector 352. Consequently, the input connected to latches 320, 322 or the inputs connected to latches 324, 326 are addressed. To complete the enabling of the latches, it is necessary to receive a logic 1 on the Unit Select line 380 and a logic 1 on the Module Select line 382. These two lines form the inputs for NAND gates 364 connected to the NAND gates 374, 376 by inverter 366. The logic of the Unit Select line is obtained by decoding the logic on address lines $A_6$, $A_7$ as shown in FIG. 20. The logic of the module select line 382 is obtained by decoding logic of address lines $A_4$, $A_5$. A logic 0 on either line 380 or line 382 produces a logic 1 input to inverter 366. This generates a logic 0 input for NAND gates 374, 376. This creates a logic 1 in both lines 350*e*, 352*e*. As previously discussed, the logic 1 prevents operation of the selectors 350, 352. When both lines 380, 382 receive a logic 1, the addresses on address lines $A_4$–$A_7$ is coded to select the particular unit and module illustrated in FIG. 7. The logic of line $A_3$ controls which of the two selectors 350, 352 is actuated. To select the specific address, or input, which is to be directed into the input side of the selector which is enabled by line $A_3$, the lines $\overline{A_0}$–$\overline{A_2}$ are inverted by inverters 390, 392 and 394 to produce a particular logic in the address lines 350*a–c* of selector 350 and address lines 352*a–c* of selector 352. In this manner, the particular address for the eight inputs to the selector are chosen substantially in accordance with the truth table shown in FIG. 19.

In review, the appearance of the I-STROBE at the last statement of the program memory scan shifts the logic of all input lines 316 to the output terminals of the bi-stable latches 320–326. Consequently, the logic at the output of the latches during a program scan is the logic at the end of the prior program scan. Shifting of logic into all of the input latches by the I-STROBE is done simultaneously. The address of the statement then selects the logic of one of the lines 330 of a particular latch for use in the logic processing.

As an example of the function of the input module shown in FIG. 7, assume that a program statement includes a logic function using the condition of switch 300. The address of the statement will be such that lines $A_6$–$A_7$ select the unit shown in FIG. 7. Logic appearing on address lines $A_4$ –$A_5$ selects the illustrated module. The module is selected and logic on line $A_3$ enables, through lines 350*e*, the upper selector 350 so that the data on one of the eight input lines may be shifted to line 354. Lines $A_0$–$A_2$ are connected to decoding or control lines 350*a*, 350*b*, 350*c*. The binary code on these lines, when addressed properly, transfers the logic on the top input line 330 to the Z terminal. Consequently, the inverted form of the logic appears on line 354 of selector 350. Since selector 352 is not energized by line 352*e*, the line 356 is latched at a logic 1. This unlatches NAND gate 360 to allow passage of the addressed logic on line 354. Inverter 362 inverts the data from NAND gate 360 to create the I/O DATA on output line 116, connected to the data selector 110, shown in FIG. 5C.

Figure 21:
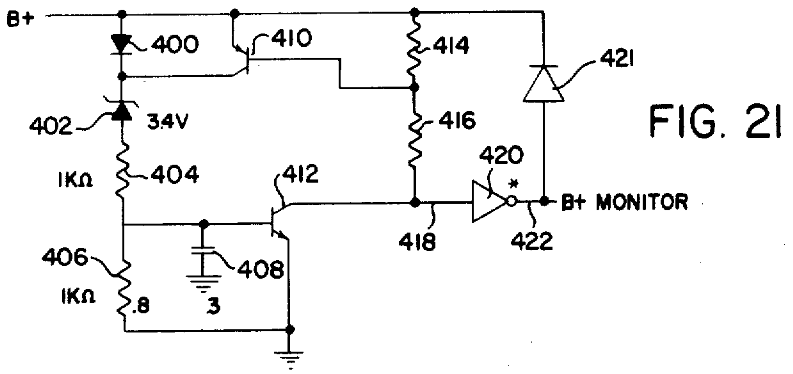
FIG. 21 is a wiring diagram illustrating the B+ Monitor circuit of the preferred embodiment of the present invention.

The input module shown in FIG. 7 also includes a circuit shown in FIG. 21 which produces a B+ monitor output to indicate the level of the B+ supply in the input module. Each of the input, output and processing modules have this type of circuit to produce a logic 1 in the B+ MONITOR line when the B+ power supply is at a sufficient level. When a B+ supply is below a set level, generally 4.0–4.5 volts, a logic 0 appears in the B+ MONITOR line to cause resetting of the controller in a manner to be discussed later. Referring now to the function of the circuit shown in FIG. 21, when the B+ supply is increasing, the B+ monitor line is a logic 0 until the B+ supply reaches approximately 4.5 volts D.C. Thereafter, the logic output in the B+ monitor line is a logic 1 and remains a logic 1 as long as the B+ supply remains at a substantial level. As the B+ supply remains at a substantial level. As the B+ supply decreases, the B+ MONITOR line shifts to a logic 0 at approximately 4.0 volts. Consequently, the shift point in the monitor is approximately 0.5 volts different according to the direction in which the B+ supply is shifting. Various circuits could be adopted for this purpose; however, in accordance with the illustrated embodiment shown in FIG. 21, the circuit includes a diode 400 having a voltage drop of approximately 0.5 volts, a Zener diode 402 with a break-down voltage of approximately 3.4 volts and two 1 Kiloohm resistors 404, 406. The capacitor 408 is used in the circuit to slow down the operation of the circuit and prevent undue oscillation. Two transistors 410, 412 control the monitor circuit, and resistors 414, 416 form a voltage divider for the base circuit of transistor 410. The circuit output appears in line 418, which is inverted by inverter 420, to the logic in line 422 which is the B+ MONITOR line.

In operation, as the B+ supply increases from 0 volts, the transistors 410, 412 are non-conductive. Since originally there is no current flow through diode 400 and Zener diode 402 there is no current flow in resistors 404, 406. Transistor 412 is turned off. Line 418 follows the B+ supply voltage because there is no current flow in resistors 414, 416. At approximately 4.5 volts, the voltage drop across Zener diode 402 and the voltage drop across diode 400 causes enough voltage across resistors 404, 406 to bias transistor 412 into conduction. This causes current flow through resistors 414, 416 which forward biases transistor 410. Line 418 is grounded by a transistor 412 and receives a logic 0 after approximately 4.5 volts. Conduction of transistor 410 shorts out the diode 400 and removes it from the voltage dividing circuit, including diode 400, Zener diode 402, resistor 404 and resistor 406. As the B+ supply voltage drops, diode 400 does not affect the turn off voltage for transistor 412. At approximately 4.0 volts this transistor turns off shifting the logic in line 418. The B+ Monitor on the various modules is used to detect when all modules are at operating voltage to start the controller during start up. Also, if a B+ supply fails, a logic 0 momentarily appears on the B+ Monitor line, including open collectors. This then gives a grounded B+ Monitor signal which is recorded in the power latch to be explained later. By using diode 421 shown in FIG. 21, a failure of the B+ will hold the B+ Monitor line to a logic 0 indicating the power failure.

The logic on lines $A_6$, $A_7$ selects the particular unit to be addressed for a given statement. Various circuits could be used for this purpose; the representative circuit is illustrated in FIG. 20 wherein inverters 430, 432, 434, 436 are connected to NOR gates 440, 442, 444, 446 to produce a decoded logic. Assume that unit 0 is to be addressed. A logic 0 appears in lines $A_6$, $A_7$ of the statement. This produces a logic 1 at the output of inverters 430, 432 and a logic 0 at the output of inverters 434, 436. Consequently, the two inputs of NOR gate 440 are logic 0. This produces a logic 1 in line 380 which addresses unit 0. Each of the additional NOR gates includes at least one logic 1 input to produce a logic 0 output. This decoder is the type used for the input module to select a particular input module being addressed. A similar decoder is used for output modules for selecting an output module since the addressing of the input modules and the output modules is basically the same procedure and the module locations may include either of these modules.

OUTPUT CIRCUIT

Referring now to FIG. 8, the preferred embodiment of the output circuit or module 70 used in the programmable controller A is illustrated. As previously mentioned, each of the separate output modules has 16 sets of terminals for 16 separate output circuits. These output circuits may include motors, solenoids or any similar A.C. or D.C. operated outputs. As additional modules are needed, additional pages or units are connected to the basic CPU of the programmable controller. The circuit shown in FIG. 8 is a single output module, and the other output modules are constructed substantially in accordance with the schematic or wiring diagram of this figure.

Binary logic of the accumulator 170, on the ACC line, is directed to the module 70 at all times. If the program memory statement includes a STO I/O instruction and one of the circuits on the output module 70 is addressed by the remainder of the statement, the information on the ACC line is transferred to one of the 16 circuits to actuate the address output circuit in accordance with the logic in the accumulator.

Output module 70 includes 16 separate memory flip-flops 450. Only eight of these flip-flops are illustrated since the second eight output memory flip-flops operate identically. For the purpose of simplicity, the operation of only the uppermost memory flip-flop 450 and its associated circuitry will be discussed. This description will apply equally to all of the other memory flip-flops, each of which is connected to a specific single output circuit having a known address selected in accordance with previously discussed programming of controller A. The memory flip-flop, or register, 450 is a somewhat standard D-type flip-flop wherein the logic of the D terminal is clocked to the logic of the Q terminal upon receiving a positive going clock pulse at the clock terminal C. A logic 0 at set terminal S produces a logic 1 at the Q terminal. The $\overline{Q}$ terminal of the flip-flop 450 is not used in the illustrated circuit. The reset terminal R is latched to the +5 volt B+ power supply to prevent resetting of the Q terminal to a logic 0. The logic of the accumulator appearing at line ACC is inverted three times by inverters 452, 456 and 458 before being directed to the D terminal of flip-flop 450. Inverter 458 is used to direct $\overline{ACC}$ logic to the second group of flip-flops, not shown in detail. To control the set terminal S, a $\overline{RESET}$ signal is directed through inverters 460, 462 to the S terminal of the flip-flops. These flip-flops are positioned in groups of four with line 464 controlling the upper group and the line 466 controlling the lower group. Each of these flip-flops is a memory device for a particular output circuit. The output of flip-flop 450 is directed through line 470 to a zero crossing logic transfer gate 472 which is a second D-type flip-flop. Register 450 retains logic indicative of the desired logic of its associated output circuit. The logic of flip-flop 450 is directed to the D terminal of flip-flop 472. A clocking pulse at terminal C of the zero crossing flip-flop 472 transfers the logic from line 470 to the Q output 474. This forms an input for a pulse transformer driver gate, or OR gate 476. The output 478 of OR gate 476, when actuated, is shown as a train of pulses 479.

Assuming that a proper address exist for storing or actuating the output associated with the upper flip-flop 450, the inverted logic on $\overline{ACC}$ is transferred into the flip-flop. The output 470 then contains the inverted accumulator logic $\overline{ACC}$ which is applied to the input terminal of flip-flop 472. A clocking pulse to this flip-flop then transfers the inverted logic $\overline{ACC}$ to line 474. Assume that the output circuit being discussed is to be actuated, a logic 0 appears at the input 474 of OR gate 476. As the logic 0 appears in $\overline{\text{T-STROBE}}$ the output of OR gate 476 produces a logic 0 pulse 479. The T-STROBE is synchronized by the I-STROBE and generally occurs each 16 statements. The first pulse turns the output circuit on. Thereafter, the subsequent pulses 479 maintain the output circuit actuated. Also, they have other functions in the invention.

Output circuit 480 includes reverse polarized diodes 482, 484. The latter is an LED. The pulses 479 light the LED and maintain it lighted as long as pulses are being created at OR gate 476 by the T-STROBE. If the associated output circuit is to be turned off, a logic 1 appears in line 474. This prevents the pulses 479 from being periodically formed by the T-STROBE. Pulses 479 actuate the pulse transformer 486 which turns on triac 490 by gate 492 with the first gating pulse. This energizes the output circuit, which may be an output coil 494 controlled by AC lines L1, L2.

In essence, the desired logic for each circuit is stored in one of the memory flip-flops 450. This logic is then transferred from flip-flop 450 to input of OR gate 476 at the time of zero crossing for the A.C. power supply. This function is performed by the X-STROBE, which will be explained later. By transferring the logic information to the OR gate 476 at the exact time of zero crossing, the triac 490 can be turned on near the zero crossing point of the A.C. power supply.

The memory flip-flop 450 is clocked by the logic output of an O-STROBE decoder 500 having 16 separate inverted outputs $\overline{Q0}$–$\overline{Q15}$ and four addressed inputs controlled by address lines $A_0$–$A_3$ received from inverters 502. The decoder 500 is somewhat standard 1–16 type of decoder and is schematically illustrated in FIG. 22. If enabling terminals E1, E0 are logic 0, one of the outputs is at a logic 0. This produces a logic 0 to the clock terminal of the flip-flop 450 associated with the address contained on lines $A_0$–$A_3$. Since there may be more than one output module 70, the module is enabled by a logic 1 on the Unit Select and Module Select lines. These lines form inputs to the NAND gate 504. A logic 1 at both inputs, produces a logic 0 at the enabling terminal $E_1$. A logic 1 in the O-STROBE is inverted by inverter 505 to produce a logic 0 at the second enabling terminal $E_0$. The O-STROBE appears concurrently with a C-STROBE; therefore, the enabling terminal $E_0$ is enabled for only a portion of the total statement time. In this instance, the output addressed by lines $A_0$–$A_3$ causes a logic 0 output pulse in a clocking line for clocking the information from the accumulator into the flip-flop 450. To control the flip-flop 472, the X-STROBE is inverted first by inverter 506 and then by inverter 508. This strobe is a logic 1 pulse ocurring at each time the line voltage crosses zero and lasting for approximately 1–2 msec. The last strobe used in the previously discussed output circuitry is the T-STROBE which is received in the inverted form by inverter 512. This inverts the strobe and directs it to the first input of NAND gates 514, 516. Under normal circumstances, the NAND gates are enabled and the $\overline{\text{T-STROBE}}$ then appears at the input side of OR gates 476. The operation of this pulse has been previously described. The logic 0 pulse on the $\overline{\text{T-STROBE}}$ line produces a turn on pulse 479 in line 478. If this turn on pulse remains for a prolonged time, it in effect shorts the power supply and can damage certain of the integrated circuits and other components of the module. For this reason, there is provided an error detector circuit 510 for detecting when a logic 0 remains at the input side of inverter 512 for a time between 20 μsec and 50 μsec. This circuit includes inverters 520, 522 and 524 and an R.C. circuit including resistor 526 and capacitor 528. Under normal conditions, the capacitor is discharged by periodic pulses of approximately 35 μsec ocurring each approximately 40 μsec as appearing on the $\overline{\text{T-STROBE}}$. When the capacitor is discharged., there is a logic 1 at the output of NAND gate 524. This allows the NAND gates 514, 516 to function essentially as inverters. If the $\overline{\text{T-STROBE}}$ line is grounded to produce a logic 0 input at inverter 512, there is a logic 1 output for inverter 522. This charges capacitor 528 through a resistor, not shown, in the input of the inverter 524. Resistor 526 protects inverter 522. Within approximately 30 μsec the input of inverter 524 becomes a logic 1. This produces a logic 0 at the output which clocks the output of NAND gates 514, 516 to a logic 1. This is a turn off signal for OR gate 476 and prevents damage to the internal circuitry of the module 70.

It is noted that in the output circuit 480, the LED 484 is actuated as long as a 0 logic appears in line 474. Consequently, the existence of this light indicates that the programmable controller A has actuated this particular output circuit. If the output is not operating, while the LED is in operation, this indicates that corrective measures must be taken beyond the secondary 486a of the pulse transformer 486.

A D.C. output circuit may be used for one of the circuits 480. Such a circuit is illustrated in FIG. 23. The pulse transformer secondary 486a is connected in series with a diode 530 and in parallel with capacitor 532 and resistor 534. This circuit controls a power Darlington transistor 536 having output leads connected in parallel with the resistor and diode for controlling appropriate D.C. device 538. It is appreciated that certain of the 16 output circuits of module 70 may not be used; however, each module does have capabilities of controlling 16 separate and distinct, addressable output circuits, of the A.C. or D.C. type.

As discussed in connection with the programming of the programmable controller, it is possible to use the condition of an output circuit for logic processing. Consequently, it is necessary to provide circuitry for directing the logic of a particular output circuit to the logic processing circuits of the CPU. This is done in FIG. 8 by providing two 1–8 selectors 540, 542 which is similar to the selector 350 in the input circuit of FIG. 7 and the diagram of FIG. 19. These selectors produce an inverted output at the $\overline{Z}$ terminals in accordance with the code received on the control lines connected to terminals A, B and C. The selector 540 is used for the eight circuits shown in the upper portion of FIG. 8. The selector 542 is used for the other eight output circuits of the output board, or module. Line 470 contains the inverted logic for a particular output. This inverted logic is connected to the selector 540 by lines 542a–542h. Consequently, the eight inputs of the selector 540 contain the logic of the memory flip-flops 450. When the selector 540 is enabled by a logic 0 at the E terminal, the particular input addressed by the lines $A_0$–$A_2$ is inverted and appears at output 540a. To enable selectively the selectors 540, 542, the logic of line $A_3$ is connected to an inverter 544. NAND gates 546, 548 then receive either the inverted or non-inverted form of the logic on line $A_3$. This produces a logic 0 at one input of one NAND gate and a logic 1 at one input of the other NAND gate. This enables one of the selectors when the module of FIG. 8 is activated by two logic 1 inputs of NAND gate 504 having an output which is inverted by an inverter 550 and then connected to the inputs of NAND gates 546, 548. Outputs 546a and 548a, are then directed to the enabling terminals E of the selectors 540, 542. With one of the two selectors 540, 542 enabled, the the inverted form of an addressed input is directed to one of the output lines 540a, 542a. These lines are connected to the input of a NAND gate 552, the output of which is inverted by inverter 554 to produce the I/O Data. Since the inverted logic of the outputs of the selector are contained on lines 542a–h, the addressed logic is inverted before being applied to NAND gate 552. Thus, the non-inverted form of the output logic is directed to this gate. The selector not being enabled has a logic 1 in its output line 540a, 542a. Thus, the output of NAND gate 552 is the inverse of the actual logic on the addressed output line. The I/O Data is directed back to the CPU for subsequent use. In this manner, the condition of the output circuit is usable for subsequent program statements without requiring storage of this information in the RAM 42.

RANDOM ACCESS MEMORY

As previously mentioned, certain functions can be loaded (LDA) from and stored (STO) in the random access memory (RAM) 42. In accordance with the illustrated embodiment of the invention, as best shown in FIG. 5C, the memory 42 includes two separate integrated circuits 560, 562 each having 256 addressable locations. By multiplexing the integrated circuits, it is possible to obtain 512 addressed logic conditions in accordance with the binary logic on address lines $A_0$–$A_7$. The integrated circuits include enabling leads 560a (PAGE), 562a ($\overline{\text{PAGE}}$). Each of the integrated circuits 560, 562 is designated as a particular page. Select or enabling line 560a is connected to a line carrying the PAGE logic. The second enabling line 562a is connected to a line carrying the $\overline{\text{PAGE}}$ logic. Consequently, at any given time, a logic 0 appears on the enabling line of one integrated circuit, while a logic 1 appears on the other. Assuming the PAGE 0, integrated circuit 560 is to be selected, the PAGE logic is logic 0. Consequently, the $\overline{\text{PAGE}}$ logic is logic 1. This enables the integrated circuit 560 so that it decodes the logic on line $A_0$–$A_7$ to produce the logic from the address location of this integrated circuit memory unit at an output terminal 560b, which is connected to line 114 of data selector 110. Integrated circuit 562 has an output line 562b, which is also connected to the RAM Data line input 114 of the selector 110. Data is directed to the selector 110 whenever there is a logic 0 in the RAM STROBE line. Consequently, when there is no RAM STROBE, i.e., the strobe is logic 0, the addressed location of the selected RAM integrated circuit appears in line 114 for use by the data selector 110.

If a data is to be inserted into the RAM, such as on A STO RAM instruction of a statement, the lines $A_0$–$A_7$ address the selected location. A logic 1 is then created in the RAM STROBE line. Each of the integrated circuits 560, 562 includes a Data Input line 560*c*, 562*c*, both of which are connected to the ACC line 112. Thus, the data in the accumulator 170 appears at the input of the two integrated circuits or chips of the RAM 42. Consequently, upon receiving an address on address lines $A_0$–$A_7$ and a logic 1 pulse on the RAM STROBE, the data of the accumulator 170 is written in the RAM at the address position of the particular page of RAM which is enabled by a logic 0 at clip select or enabling terminal CS. Thereafter, the logic 1 disappears from the RAM STROBE. This immediately causes the two integrated circuits 560, 562 to successively direct logic addressed data to the input of the selector 110. The RAM STROBE is controlled by C-STROBE; therefore, the RAM STROBE appears in basically the same manner as the C-STROBE when a STO RAM instruction is included in a statement being processed.

Figure 24:
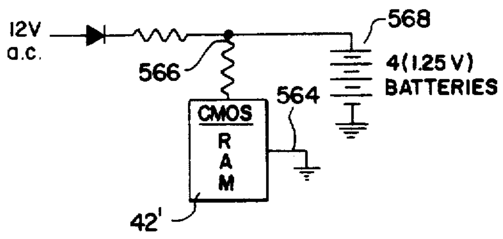
FIG. 24 is a schematic diagram illustrating the retentive RAM concept employed in one aspect of the present invention.
Figure 25:
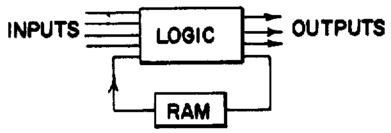
FIG. 25 is a block diagram illustrating one aspect which can be employed when the retentive RAM of FIG. 24 is used in the programmable controller.

The two integrated circuits or chips forming the RAM 42 include a −9 volt power supply connected at line 564. A +5 volt supply is provided from line 566 to the enabling terminals. When the controller A loses power or is turned on for the first time, the various addresses within the memory have random logic. Consequently, the integrated circuits "forget" the internal logic or shut down and power failures. To overcome this difficulty, which requires external relay and individual memories to remember selective information, an alternative power arrangement for the RAM 42 is shown in FIG. 24. The standard PMOS random access memory may be replaced by a CMOS RAM 42' requiring only a +5 volt power supply to maintain internal conditions. Under normal conditions, the 12 volt A.C. power supply is connected to the RAM enabling line 566 through a rectifier and resistor. Batteries 568 limit the voltage to +5 D.C. This allows operation in accordance with the previously discussed operation of the RAM. Upon power failure or shut down of the programmable controller, the 12 volt power supply disappears; however, batteries 568 including four 1.25 volt batteries maintain a +5 volt power on line 566. This retains the memory conditions of all addresses within the RAM and provides a retentive RAM arrangement. When the power goes off, the batteries hold the RAM logic constant; therefore, the RAM remembers the internal states even during power failures and shut down which can extend over several hours. This feature is not known to exist in any related type of programmable controller. By using this minimum +5 volt CMOS RAM in a retentive mode, the logic diagram appearing in FIG. 25 can be used even to remember a set of logic states after a power failure with a substantial reduction in size and costs over existing equipment. This figure is a standard block diagram of a sequential logic circuit wherein the outputs depend upon previous logic states and current input states. It was essentially impractical to employ such a logic processing system in prior devices without employing external retentive output devices, which were quite bulky and expensive. This was especially true when a large amount of remembered logic was to be employed in the system. By using the battery arrangement for a low voltage type of integrated circuit, the RAM remembers logic until it is changed; and, therefore, an output can include the combination of a current input and a memory condition. This is a substantial advance in the art to which the present invention is directed.

The relative RAM 42' of FIG. 24 differs from the RAM 42 shown in FIG. 5C in that the non-retentive RAM is of the PMOS type and requires a +5 voltage on line 566 and a −9 voltage on line 564. The RAM could be converted to a retentive random access memory by employing a +5 volt battery and a −9 volt battery. This adds to the cost. In addition, the PMOS memory requires a substantial current compared to a CMOS memory. Consequently, the batteries would discharge rapidly.

By employing a RAM, either of the retentive type of non-retentive type, control relays in a relay logic diagram which are used only to perform internal logic functions can be stored in the RAM; therefore, there is a substantial reduction in the output circuits. Without using the RAM, each control relay of the logic diagram would have to have its own output circuit for subsequent use of the relay condition. In the present invention, control relays or coils within a logic diagram of the relay logic type may simply be given RAM address instead of an output module circuit address. This is a significant cost savings since the complete 512 RAM positions can be purchased, at this time, for less than the cost of a single output module which contains only 16 circuits. It has been found that 512 control relays which can be stored in the RAM is sufficient for even the most complex system using the present invention. When less than 256 RAM positions or addresses are required, a single page integrated circuit 560 may be used.

PAGE REGISTER

In some instances, two separate pages are used in controller A. This provides additional input and output circuits. In addition, the RAM 42 is divided into two separate pages to provide 512 separate addresses for logic insertion and use. For this reason, the addresses for RAM locations and input and output circuits include a page designation. In programming, generally a single page is used for several program statements. Then a set page instruction (SPG) is given in a statement. This produces a logic 0 at the output of the operation selector 90 shown in FIG. 5B. This controls the page register 580 so that subsequent statements are processed in the page which is set by register 580. A subsequent page change instruction (SPG) is programmed to again change the operating page. In accordance with the preferred embodiment of the invention, the page register 580 is somewhat standard D type flip-flop with the D terminal connected to address line $\overline{A_0}$. Thus, if a page 1 is called for by logic 0 on line $\overline{A_0}$, the D terminal of the page register 580 receives a logic 0 on line $\overline{A_0}$. Flip-flop or register 580 is clocked by a 0 logic on $\overline{SPG}$, line which is inverted by inverter 582 and directed to one input of a NAND gate 584. The other input of this NAND gate is connected to the C-STROBE. The output 586 of NAND gate 584 is used to clock the register 580. If a page change is to be made, a logic 0 appears at inverter 582. This causes a logic 1 at one input to NAND gate 584. As soon as a C-STROBE is received in a program statement requesting a page change, a logic 0 appears in line 586. The register 580 is clocked on the positive going pulse when this logic 0 shifts back to a logic 1; therefore, when the C-STROBE disappears during the change page statements (SPG), output 586 shifts back to the normal logic 1 position clocking the information on the $\overline{A}_0$ line to the Q terminal of register 580. This information appears in line 586 and, in inverted form, in line 588. These two outputs of the register 580 form inputs of NAND gates 590, 592 through OR gates 591,593. The output of the first NAND gate is the line designated PAGE. The output of the second NAND gate 592 is the line designated $\overline{PAGE}$. These lines control the RAM 42 as previously described. The OR gates 591, 593 are operative during the reset function to be explained later.

The $\overline{PAGE}$ line is connected to the input of NAND gate 594, the output of which is the $\overline{O\text{-}STROBE}$ to PAGE 0. The output of NAND gate 594 is inverted by inverter 596 to produce the O-STROBE in the CPU, which is also in PAGE 0. In a like manner, the PAGE line is connected to NAND gate 598 to control the $\overline{O\text{-}STROBE}$ to PAGE 1. The O-STROBE logic is, thus, directed to one or the other of the PAGEs in accordance with the logic on the outputs of NAND gates 590, 592. To control the O-STROBE creating NAND gates 594, 598, a NOR gate 600 includes one input which goes to a logic 0 when there is a STO I/O instruction. The output 602 of this NOR gate is directed to one input of a NAND gate 604. The other input of this NAND gate is a C-STROBE. The output of the NAND gate 604 is inverted by inverter 606 and controls the O-STROBE through NAND gates 594, 598. Consequently, the NAND gates 594, 598 determine which of the PAGEs receive the $\overline{O\text{-}STROBE}$. If PAGE 0 is set by the page register 580, the $\overline{PAGE}$ line has a logic 1. This allows the $\overline{O\text{-}STROBE}$ to be created at the output of NAND gate 594 which is connected to PAGE 0 and the CPU which is Unit 0 of Page 0. A logic 0 appears in the PAGE line; therefore, NAND gate 598 is latched to a logic 1 output, and PAGE 1 does not receive an $\overline{O\text{-}STROBE}$ and is inoperative. The reverse action occurs when the page register is set to PAGE 1. When a logic 0 is received in $\overline{RESET}$ 610, register 580 is set to a logic 1 which corresponds to Page 0. At the same time the logic on line 610 is inverted by inverter 611 to apply a logic 1 to OR gates 591, 593. This enables both pages of the random access memory.

ACCUMULATOR

The accumulator 170, which has been discussed briefly in connection with the general operation of the programmable controller, includes a D-type flip-flop having an input line 168 from the $\overline{Z}$ terminal logic selector 130. The binary logic on line 168 is clocked into the Q terminal of the accumulator 170 upon a positive going pulse in clocking line 172. This is caused by the appearance and then disappearance of the C-STROBE. When a logic 0 appears in $\overline{RESET}$ line 610, the accumulator is set to a logic 0. The Q terminal output line 612 is connected to an inverter 614 to create the $\overline{ACC}$ line. In a similar manner, the $\overline{Q}$ terminal of accumulator 170 is connected to line 616 which is inverted by inverter 618. This creates an ACC line for the CPU. In a like manner, an inverter 620 inverts the logic on line 616 to create the ACC line 112 for use in the logic selector 130. This line is then inverted by inverter 622 to create a $\overline{ACC}$ line for both PAGE 0 and PAGE 1. This circuitry is shown in FIG. 5B. The ACC line 112 is shown in FIG. 5C as an input to the data selector 110.

SEIPP REGISTER

The Seipp register 630 shown in FIG. 5B forms a specific aspect of the present invention. The word SEIPP stands for Skip Enable In Program Processing. The device functions to inhibit selected STO instructions in the program contained in the program memory 50. When the Seipp register 630 is at a logic 1, it has no effect in the processing of the program statements. When the Seipp register is set to a logic 0, subsequent STO instructions in the program statements are not executed until the Seipp register is again set to a logic 1. This register is shown more clearly in FIG. 26 and is a somewhat standard D-type flip-flop. The set terminal S is connected to $\overline{RESET}$ line 610 to reset the register to a logic 1 during reset of controller A. Logic appearing on the Q terminal of accumulator register 170 is directed through line 612 to the D terminal of the Seipp register 630. The clocking terminal T, referring to "toggle," is controlled by the appearance of a logic 0 on the $\overline{STS}$ line created by operation selector 90 when the logic of lines $I_0$–$I_3$ indicates a statement requesting a STO Seipp function. This logic is inverted by inverter 632 and directed to one input of NAND gate 634. The other input of the NAND gate 634 is the C-STROBE; therefore, the output of NAND gate 634 is controlled by the C-STROBE to toggle the register 630 upon a STO Seipp statement. This transfers the accumulator logic to the Q terminal of register 630 on the lagging end of the C-STROBE. Consequently, the $\overline{Q}$ terminal, connected to line 636, is the inverse logic of flip-flop 630. This logic is held in the Seipp register irrespective of changes in the accumulator until another STO Seipp instruction appears in the program. Line 636 controls the previously described NOR gate 600 and NOR gate 640. A logic 1 in line 636 latches NOR gates 600, 640 so that their outputs 602, 642, respectively, are logic 0, irrespective of the other input to the NOR gates. This latches previously described NAND gate 604 and NAND gate 644 to a logic 1 output. The $\overline{O\text{-}STROBE}$ remains at a logic 1 which is the non-actuated state. In addition, NAND gate 644 is latched to a logic 1 in output line 645 which is connected to NAND gate 646. Line 645 is basically the $\overline{RAM\ STROBE}$ which is inverted by NAND gate 646 to provide the normal RAM STROBE to set the RAM to the input or write mode. In certain instances, it is desirable to store the accumulator data into the RAM when a STS instruction is given. This could not be done if the Seipp register were off; therefore, line 648 connects the clock terminal of the Seipp register 630 to the second input of NAND gate 646. Consequently, a RAM STROBE is created when the STS instruction is strobed by the C-STROBE, so that the data of the accumulator is placed into the addressed RAM location. Generally line 648 is at a logic 1 and has no effect on NAND gate 646.

Figures 26, 28:
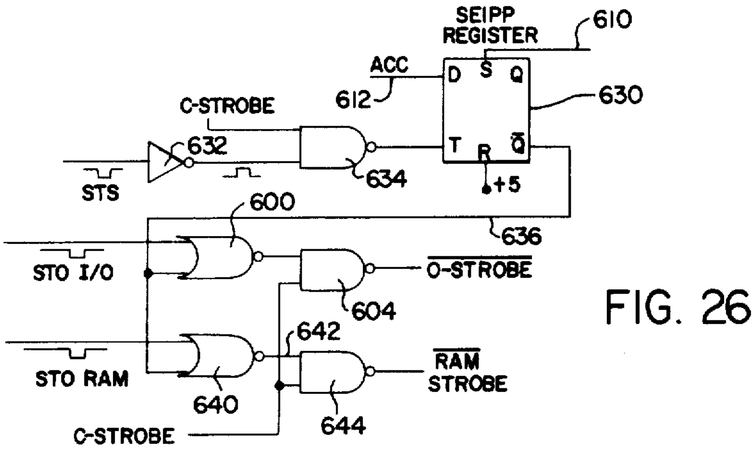
FIG. 26 is a schematic representation of the Seipp register constructed in accordance with the present invention.
FIG. 28 is a table listing the program statements for use of the Seipp register shown in FIG. 26 to perform the logic illustrated in FIG. 27.

Referring now to FIGS. 27 and 28, there is illustrated one use of the Seipp register. Assume that it is necessary to program a four-stage shift register 650, as shown in FIG. 27, into the programmable controller A. The instructions for the shift register function are quite easily written. Basically, the LDA 3, STO 4, LDA 2, STO 3, LDA 1, STO 2, LDA DATA and STO 1 statements process the four BIT register. These statements are in program statements NOS. 11–18 of FIG. 28. However, since the program is cycled 100 times per second, under normal operation of the programmable controller A, the shift register would advance 100 steps per second. This is not in accordance with the desired operation of a shift register. The shift register must shift data upon the selected command. The Seipp register allows this to be done by inhibiting (STO) statements 12, 14, 16 and 18 until a shift command is received. Referring now to FIG. 27, a flip-flop circuit 622 has outputs Y1, Y2, intermediate control point B and an input command at X-JOG. This logic may be programmed into the controller by statements 0–10 of FIG. 28. Consequently, when the program steps through these statements, the logic of the flip-flop 652 is processed. If the last process step, which is the STS instruction, finds a logic 0 in the accumulator, the logic 0 is toggled into the Seipp register. This blocks the subsequent STO statements 12, 14, 16 and 18. Although the statements 11–18 are processed, they have no effect upon the RAM locations of register 650. Since the subsequent STO instructions are inhibited by the Seipp register, it is necessary to set the Seipp register to a logic of 1 after the shift register portion of the program has been passed. This is done by having a logic 1 at a given I/O or RAM location. Such a logic 1 is retained at the 15th I/O circuit on Page 0, Unit 3, Module 3, shown in statement No. 23 in FIG. 28. This resets the Seipp register to logic 1 by first setting the accumulator to logic 1 and then producing statement 24 which is a subsequent STS statement. This toggles the register 630 to logic 1 and allows operation of subsequent STO instructions. The program is then reprocessed until reaching statement 10 of FIG. 28. If there has been no input at X-JOG, the program is again processed without affecting the shift register. However, if there is a JOG pulse indicating that it is now time to shift the shift register 650, statement 10 will have a logic 1 at the Y1 position of the RAM. This will set the Seipp register to a logic 1 and allow normal operation of statements 12, 14, 16 and 18. After this has been done, statements 20–22 prepare the flip-flop for subsequent jogging. It is seen that by providing 24 statements, a four bit shift register can be programmed into the programmable controller A. To add additional stages to the shift register, it is only necessary to include two additional statements in the shift register statements shown in FIG. 28. A great number of shift register positions can be added with only a minimal amount of additional statements. This is a substantial advance in programmable controllers. The Seipp register does not decrease the time of the scan since each statement is still processed during the program. The Seipp register provides a convenient means for preventing the actual storing of a logic function during processing of the program. The same concept can be used in counting and other programming requiring a skip function.

RESET OF THE CONTROLLER

An important aspect of the invention is the reset circuit for the controller A. This circuit is best shown in FIG. 5D. The $\overline{\text{RESET}}$ A signal is obtained from the circuitry shown in FIG. 5A. As previously mentioned, each of the modules has a B+ MONITOR with an output line 422 that is generally at a logic 1. All of these lines converge to form the $\overline{\text{RESET A}}$ signal. If one of the B+ supplies of a module is below operating logic level, a logic 0 appears in the $\overline{\text{RESET A}}$ line. The $\overline{\text{INTERLOCK}}$ line 660 indicates that all modules are connected properly. The normal logic 0 in this line is inverted by inverter 662 to provide a normal logic 1 at line 422. A normal pull-up resistor 664 is connected to line 422 to assure shifting between logic 1 and logic 0. To reduce the noise level on the B+ supply and ground, when the TTL gates shift, there is provided a conventional capacitor network 666, as shown in FIG. 5A. This provides the necessary current for gating the various logic gates forming the logic circuits of controller A.

The $\overline{\text{RESET A}}$ line is connected to a two BIT counter formed from D type flip-flops 670, 672, shown in FIG. 5D. These flip-flops include reset lines 670*a*, 672*a*, respectively, to reset the two flip-flops to a logic 0 upon receipt of a logic 0. The flip-flops are normally at a logic 1. The Q terminal of flip-flop 670 which can be considered the A flip-flop is connected to the D terminal of flip-flop 672 which can be considered the B flip-flop, by a connecting line 674. The Q terminal of flip-flop 672 is connected to line 676. To cause counting, the $\overline{Q}$ terminal flip-flop 672 is connected to the D terminal flip-flop 670 by interconnecting line 678. The logic on line 676 is considered the $\overline{\text{RESET}}$ logic, which is inverted by inverter 680 to the reset logic in line 682. A further inversion by inverter 684 again inverts the RESET logic to a $\overline{\text{RESET}}$ logic in line 610. The logic on line 682 is also inverted by an inverter 686 to produce the $\overline{\text{RESET}}$ logic to the CPU I/O modules. A second inverter 688 inverts the output of inverter 686 to produce a RESET to both Page 0 and Page 1 for resetting the flip-flops 450 in the output modules, best shown in FIG. 8. The module shown in FIG. 8 is in the CPU; therefore, it receives the $\overline{\text{RESET}}$ logic as shown in FIG. 5D. The other output modules receive a $\overline{\text{RESET}}$ pulse from an interface inverter, not shown, that is driven by the inverter 688 of FIG. 5D. Flip-flops 670, 672 are clocked by a NAND gate 690 having an output 692 connected to the clocking terminals of both flip-flops. NAND gate 690 is controlled by the I-STROBE and by the RESET logic on line 682.

In operation, when there is a power failure, an interruption of the B+ power supply of any module, or an interruption of the module interconnect, a 0 logic appears in the $\overline{\text{RESET A}}$ line. When the power supply starts up again, or when the $\overline{\text{INTERLOCK}}$ is restored, this logic 0 is momentarily held on the $\overline{\text{RESET A}}$ line as previously discussed in connection with the B+ monitor shown in FIG. 5A. Logic 0 on the $\overline{\text{RESET A}}$ line resets flip-flops 670, 672 to a logic 0 for as long as $\overline{\text{RESET A}}$ is at a logic 0. This is shown in the truth table of FIG. 5D. Consequently, there is a logic 0 in line 676 to produce a logic 1 in the RESET line 682. This enables NAND gate 690. Upon receipt of the first I-STROBE at the end of the program scan, i.e., statement No. 4095, the two flip-flops 670, 672 are clocked. This clocks a logic 1 from line 678 to flip-flop 670. Line 674 was at a logic 0; therefore, a logic 0 is retained in flip-flop 672 and on line 676. The RESET signal in line 682 remains at a logic 1. This gives a second opportunity for an I-STROBE to actuate NAND gate 690. When this happens, there is a subsequent clocking of both flip-flops 670, 672. This clocks the logic 1 from line 674 into flip-flop 672. Since line 678 was logic 1, both flip-flops are now in their normal logic 1 condition. This produces a logic 0 in the RESET line 682 and blocks or latches NAND gate 690 to a logic 1 output. During the reset operation, the $\overline{\text{RESET}}$ line 610 was at logic 0 for the first two counts; therefore, the accumulator 170 was reset to logic 0, the page register is set to Page 0 and the Seipp register was set to a logic 1, which is its normal condition. At the same time, RESET signal resets the output memory register 450 to turn off all outputs.

Two I-STROBES are needed to shift the counter, including flip-flops 670, 672, to their normal condition after a RESET A pulse. Consequently, the RESET remains for the first partial program and for the next complete program scan. By this manner, there is at least 10 msec in the reset cycle. This assures a progress through at least one complete program so that all RAM locations can be set to the desired logic condition, i.e. logic 0.

To explain the operation of the RAM setting by the RESET, there is provided a retentive memory control circuit 700 including a switch 702 which is in the off position when a non-retentive RAM is being used, a bi-stable flip-flop including NOR gates 704, 706 with outputs 704*a*, 706*a*, respectively, NOR gates 710, 712 and an output NOR gate 714. Assume that there is a non-retentitve RAM being used, switch 702 is in its off position, as shown in FIG. 5D. This places a logic 1 in line 704*a* and a logic 0 in line 706*a*. A logic 0 is thus produced at the output of NOR gate 710 to enable NOR gate 714. The RESET A line is normally 1; therefore, NOR gate 712 has a logic 0 output to cause a logic 1 in line 716 which enables both NAND gates 590, 592 in FIG. 5B. Consequently, both pages of the RAM are enabled by OR gates 591, 593 controlled by the RESET from inverter 611. The logic of the RAM is reset to the desired logic 0 at each memory location in the various statements of the program memory. This concept is used to assure proper memory setting of the memory location during the reset cycle or operation, when a non-retentive type of RAM is used.

When the information is to be retained in the memory 42 by a retentive RAM, switch 702 is placed into the on position. This produces a logic 0 in line 704*a* and a logic 1 in line 706*a*. This unlatches NOR gate 710 and latches NOR gate 712. A logic 0 appears in line 676 during the RESET cycle; therefore, a logic 1 is directed to NOR gate 714. This produces a logic 0 in line 716 to inhibit or latch NAND gates 590, 592. This produces a logic 1 at both the PAGE and PAGE lines. This inhibits both memory pages by producing a logic 1 in the enabling lines 560*a*, 562*a*, as shown in FIG. 5C. Consequently, during the cycling of the program memory during the reset cycle, there is no change in the logic of the RAM. This is used when the retentive RAM of FIG. 24 is employed in the programmable controller A.

POWER MONITOR CIRCUIT

The power monitor circuit 720 is shown in FIG. 5C and creates a logic on the PWR line and creates the X-STROBE. A voltage divider formed from resistors 722, 724 direct the A.C. supply to full wave rectifier 726 having an internal voltage drop of approximately 1.2 volts. The rectifier drives LED 728, having a power drop of approximately 1.6 volts. Consequently, the LED 728 is lighted each time the output of the full wave rectifier exceeds approximately 2.8 volts. This LED is off when the output of the full wave rectifier is below about 2.8 volts; therefore, the photo-responsive transistor 730 is deenergized at the zero crossing of the power supply for a short period of time. The spacing between the pulses is approximately 8.33 msec. Consequently, transistor 732 is pulsed each 8.3 msec. This pulsing output is directed to the inverter 734, which inverts the pulse train and provides the X-STROBE for Page 0 and Page 1. Inverter 736 inverts the output of inverter 734 to create an X-STROBE for the CPU. Transistor 730 causes a similar pulsating action by transistor 740 which is connected to ground through a filtering capacitor 742. This presents a D.C. power supply to turn on transistor 744. Consequently, during normal operation the PWR is grounded and has a logic 0.

If the power supply to the full wave rectifier 726 is interrupted, transistor 744 stops conducting and the PWR line goes to a logic 1. This logic 1 on the PWR line is created by the 5 volt power supply which follows the D.C. power supply of the various modules. These power supplies have sufficient internal capacitance to maintain the logic 1 on PWR line for approximately 100 msec. If the power supply is only interrupted for a short period of time, i.e. less than the 100 msec which holds the PWR to a logic 1, the logic 1 on the line PWR immediately shifts back to the normal logic 0 condition when A.C. power is restored.

The input module shown in FIG. 7 has bi-stable latches 320 which are activated by the I-STROBE. If the power is interrupted the input circuits are turned off. An I-STROBE during this shut down would immediately turn off all input latches and disable the operation of the programmable controller. The I-STROBE appears every 10 msec; therefore, the input data can be retained for no more than 10 msec. This does not take advantage of the fact that at the B+ power supply can be held to an operative level for approximately 100 msec. The power monitor circuit 720 allows controller A to hold the inputs until the D.C. power supply decays to a level which will initiate the RESET A. Consequently, the controller A can take advantage of the slow decay of the B+ to retain operation of the controller even though momentary interruptions of the power supply occur.

To accomplish the above, the PWR and the RESET A are coupled to the input of NAND gate 750 having an output coupled to one input of NAND gate 752, as shown in FIG. 5D. The output of the NAND gate 752 is inverted by inverter 754 to produce an I-STROBE for the CPU. This I-STROBE is, in turn, inverted by inverter 756 to produce the I-STROBE to both Page 0 and Page 1. The other input to the NAND gate 752 is the I-STROBE line of the statement counter 82 which is at logic 1 on the last statement of the program. Under normal conditions, the PWR is grounded. This provides a logic 0 at the input of NAND gate 750 and a logic 1 at one input of NAND gate 752. Consequently, the positive pulses of the I-STROBE are inverted by NAND gate 752 to produce the I-STROBE for the input modules. Assume now that the A.C. power supply is lost. PWR immediately shifts to a logic 1. The B+ power supply remains for approximately 100 msec. Consequently, the RESET A line remains at a logic 1 for approximately 100 msec, the same basic time that a logic 1 can be held on the PWR line. During this time, both inputs to the NAND gate 750 are logic 1. This produces a logic 0 output to latch NAND gate 752 with a logic 1 output. This produces a logic 0 in the I-STROBE to the CPU and a constant logic 1 to the I-STROBE of Page 0 and Page 1. This latching of logic on the I-STROBE lines prevents any I-STROBE pulses and lasts for about 100 msec. Thus, the bi-stable latches 320 of FIG. 7 retain, or "remember" the input conditions prior to the momentary loss of power. If the power comes back on prior to the 100 msec, the $\overline{PWR}$ shifts back to a logic 0. This then creates a logic 1 output for NAND gate 750 so that NAND gate 752 is again unlatched and the controller functions normally.

If the power supply is lost for a time greater than approximately 100 msec, the $\overline{RESET\ A}$ finally shifts to a logic 0. This provides a logic 1 at the output of NAND 750 and causes release of NAND gate 752. An I-STROBE then removes the information from the input latches 320.

Figure 29:
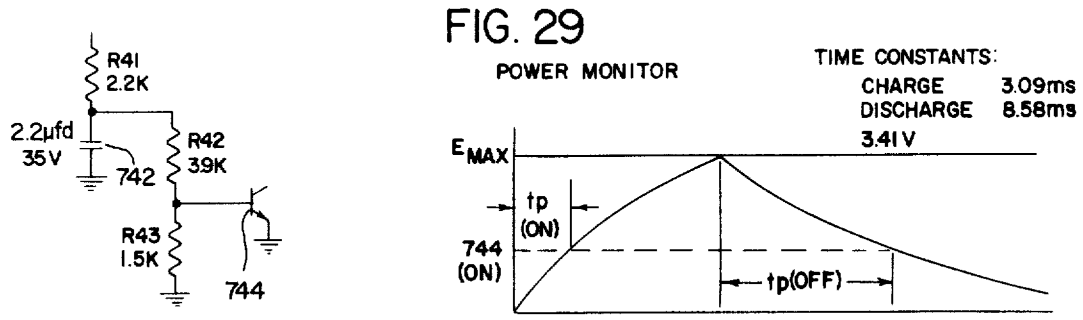
FIGS. 29 and 30 are wiring diagrams and charging, discharging curves for the power monitor circuits and input circuits, respectively, of the preferred embodiment of the present invention; and, FIG. 31 is a graph illustrating certain pulses developed by the preferred embodiment of the present invention.
Figure 30:
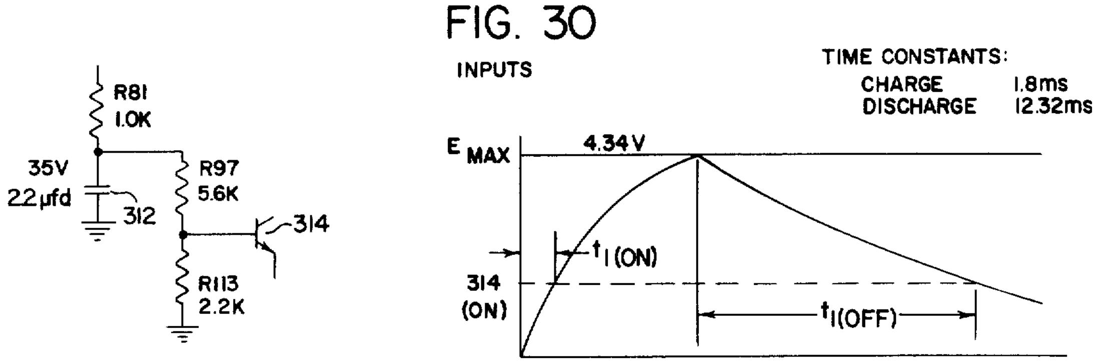

Although the $\overline{PWR}$ line and the input circuits shift at the time of a power stoppage, there is a delay of a few msec provided in each of these circuits. The time constant of the input circuit for controlling transistor 314, as shown in FIG. 7, and the time constant for controlling transistor 744 of the power monitor, shown in FIG. 5C, are selected such that when the power is turned off, or interrupted, the power monitor is operated by non-conduction of transistor 744 before the input is turned off by the non-conduction of transistor 314. In this manner, the power monitor circuit inhibits the I-STROBE before the input circuit can change the condition seen by the bi-stable latches 320. When the power is turned on, it is desirable to have the inputs come on before the power monitor shifts conditions. In other words, the inputs are energized prior to the shifting of the $\overline{PWR}$ line from logic 1 back to logic 0. In this manner, the I-STROBE will not appear until the inputs have been re-established at the input modules FIGS. 29 and 30 show the time constant concept and the maximum voltage level to which capacitors 312, 742 are charged to provide the desired time delays. Transistors 314, 744 are controlled by a voltage divider connected in parallel across the control capacitors 312, 742. These resistors from, with the power supply resistors R41, R81 a power divider which controls the maximum level to which the different capacitors can be charged. This value taken together with the values of the respective time constants created by the component values shown in FIGS. 29 and 30, produce charging and discharging circuits as shown in the respective figures. When power is turned on, the charging curves are used. The time $t_i$ (on) is substantially less than the time $t_p$ (on). Consequently, during power turn on, the inputs are activated prior to the power monitor. When the power is turned off, the capacitors are discharged through the discharging portions of the curves, as illustrated. In this instance, the time for the power monitor to activate is $t_p$ (off) which is less than the time $t_i$ (off) for the input circuits to be turned off. These relative times can be controlled by shifting the maximum voltage to which the capacitors are charged and the time constants for charging and discharging. The time constants change between charging and discharging because of the difference in the charging and discharging paths being employed. It is noted that during discharging, the resistors R43, R113 are in the discharging path of the capacitors 742, 312, respectively. This drastically increases the time constant for the circuits during discharging. The approximate values of the time constants and the maximum voltages are provided together with a dashed line representing the conduction voltages of the transistors 314, 744. These parameters can be changed and still obtain the same relative times.

GENERATION OF T-STROBE

Figure 31:
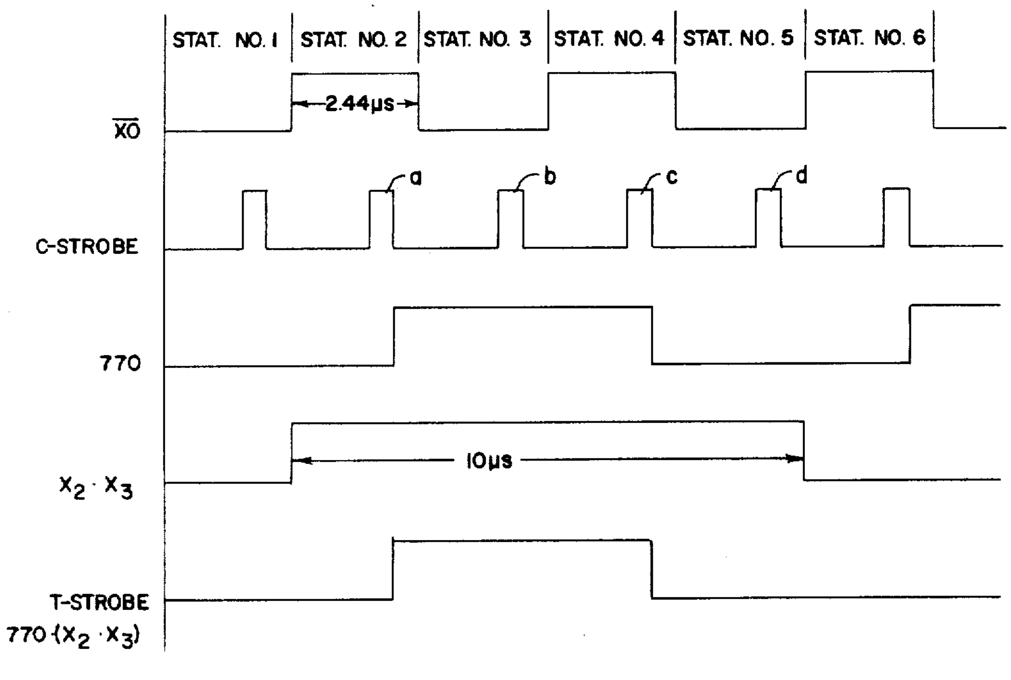

The T-STROBE is a positive pulse directed to the pulse transformer driver 476 to create a succession of pulses 479 in line 478. The width of this pulse is approximately 5 μsec occurring every 40 μsec, and it is synchronized with the C-STROBE so that the triacs are turned on with a signal lasting at least 2.44 μsec. This time is sufficient to turn on the triacs with the pulse transformer 486. The pulses used in creating the T-STROBE are shown in FIG. 31, and the circuitry for obtaining these pulses is shown in FIG. 5D. The synchronizing flip-flop 760 has its $\overline{Q}$ terminal connected to its D terminal by line 762. Consequently, the logic of this flip-flop alternates from one clocking to the next. Clocking or toggling of the flip-flop, is controlled by a NAND gate 764 having a first input 766 connected to the $\overline{X_0}$ line and a second input connected to the C-STROBE. The output 768 of the NAND gate clocks the flip-flop 760 to control the logic within line 770, which is connected to the Q terminal of flip-flop 760 and forms one input of a NAND gate 772. The second input of the NAND gate 772 is controlled by NAND gate 774 having inputs 776, 778 connected to $X_2$, $X_3$, respectively. The logic of the NAND gate 774 is inverted by inverter 780 before it is connected to the second input to the NAND gate 772. Referring now to FIG. 31, the $X_0$ line alternates on each successive program statement. Consequently, the $\overline{X_0}$ line at input 766 of NAND gate 764 alternates between logic 0 and logic 1 every 2.44 μsec. The C-STROBE occurs during each statement. The $\overline{X_0}$ with the C-STROBE produce the output 770 of flip-flop 760 shown in FIG. 31. At the same time, the lines $X_2$, $X_3$ are ANDed by NAND gate 774 to produce a window or pulse of 10 μsec occurring approximately every 40 μsec and shown in FIG. 31. This window is inverted twice and appears as shown. The two inputs of NAND gate 772 are the 10 μsec window and line 770. This produces the $\overline{T\text{-}STROBE}$ used in the CPU. Inverter 782 inverts this strobe to produce a T-STROBE, as shown in FIG. 31. Since the output is shifted on the trailing edge of the C-STROBE, the T-STROBE occurs for at least about 2.5 μsec during a turn on cycle. For instance, assume that an input is turned on by a C-STROBE *a.* Then, the total T-STROBE is available for turning on the triacs. If the C-STROBE *b* is used to turn on the triac, then approximately one-half of the T-STROBE is used for the tun on process. This is the minimum amount of T-STROBE available for turning on the triac. If C-STROBE *c* or *d* activates an output, the T-STROBE appears after the turn on command and a complete T-STROBE is available. Consequently, these two C-STROBEs have access to a complete T-STROBE for turning on the triac. This provides an adequate time for a signal to turn on the triac during operation of the controller A.

The NOR gate 790 shown in FIG. 5D is used to inhibit or synchronize the T-STROBE. When a logic 0 appears in the output of this NOR gate, flip-flop 760 is reset. This occurs at two separate times for different purposes. First, the line 770 is reset to a logic 0 during the last statement of the program which creates the I-STROBE for setting the input conditions into the input side of the CPU. When this happens, the T-STROBE is synchronized to a logic 0 at statement 4095. This assures that during the window of line $X_2$ ANDed with $X_3$ there is a single total logic 1 pulse, as shown in FIG. 31.

Second, when the programmable controller is being reset, a logic 1 appears on line 682. At that time, there is a logic 0 at the output of NOR gate 790 to set the flip-flop 760 to a logic 0. This latches NAND gate 772 to inhibit turn on of the output triac during RESET. At other times, NOR gate 790 is inoperative and has an output of logic 1.

POWER LATCH

In some installations, it is necessary to know whether or not there has been a power failure during the operation of the programmable controller A. When using a non-retentive RAM as illustrated, this can be done by sensing a particular RAM location; however, the preferred embodiment of the present invention includes a power latch circuit 800, shown in FIG. 5A. The power latch circuit 800 includes NOR gates 802, 804 having outputs 802*a*, 804*a*. The condition of this circuit indicates if the controller has been reset because of a power failure. To reset the circuit for sensing a further power failure, there is provided a circuit including NOR gates 810, 812 and a NAND gate 814. The operation of these circuits will be explained in connection with the function of the power latch circuit 800. Upon a power failure and subsequent resumption of power, a logic 1 appears in the RESET line 682, in accordance with the truth table shown in FIG. 5D. When this happens, the accumulator register 170 is reset to logic 0. Consequently, the logic on $\overline{ACC}$ is a logic 1 which produces a logic 0 at the output of NOR gate 812. At the same time, a logic 1 appears at line 682 forming one input of NOR gate 802 of the power latch 800. This provides a logic 0 in line 802*a*. Consequently, two logic 0 appear at the input of NOR gate 804. This shifts the logic of the $\overline{PWL}$ to a logic 1. At the same time, a logic 1 appears in line 804*a* to lock the latch in the condition indicating that there has been a power failure and a subsequent resetting of the programmable controller.

As long as either the $\overline{A_1}$ line or the $\overline{INV}$ line is at logic 1, the condition of the $\overline{PWL}$ line remains the same. This is illustrated graphically in the table of FIG. 9. With a logic 1 on either of these lines, the output of NOR gate 810 is a logic 0. This produces a logic 1 output for NAND gate 814 and a logic 0 output for NOR gate 812.

Assume that the condition of the power latch is to be loaded into the accumulator, a LOAD PWR LATCH instruction is given. A logic 0 appears in line $\overline{INV}$ and in line $\overline{A_0}$ and a logic 1 appears in line $A_1$. The NOR gate 810 is latched by the $A_1$ line and the power latch 80 is not toggled. The two inputs to NOR gate 180 are at a logic 0; therefore, there is a logic 0 in line 182. This produces a logic 0 in line $\overline{LPL}$ which is connected to control line 110*a* of data selector 110. This combines with the logic 0 on line 110*c* to pass the $\overline{PWL}$ logic to the invert input 160 of logic. selector 130. Thus, the $\overline{PWL}$ logic is inverted and directed to accumulator 170. This produces a logic 0 in the accumulator if the $\overline{PWL}$ line is logic 1 indicating a reset has occurred. If there has been no power failure since the last time the power latch was set, the accumulator receives a logic 1.

After the power latch has sensed a power failure, it may be desired to set the latch to a logic 1 to sense another power failure.

If the accumulator is at a logic 1 when a STO POWER LATCH instruction appears, the power latch 800 is set to a logic 1 and a logic 0 appears in $\overline{PWL}$. In FIG. 9, the $\overline{A_0}$, $\overline{A_1}$ and $\overline{INV}$ lines each have a logic 0. This given a logic 1 input to NAND gate 814 and allows the C-STROBE to create a logic 0 pulse to NOR gate 812. This toggles the power latch 800 to the set position if the $\overline{ACC}$ line is a logic 0. Lines $\overline{A_0}$ and $\overline{INV}$ produce a logic 1 in line 182. This causes line $\overline{LPL}$ to be a logic 0. Consequently, the condition of $\overline{PWL}$ before the C-STROBE, is passed through data selector 110 and inverted by the logic selector 130. This sets the accumulator to the logic of the power latch 800.

The STO POWER LATCH and INV instruction will set the power latch as discussed above. As shown in FIG. 9, the $A_0$ line is at a logic 0. This produces a logic 1 in $\overline{A_0}$ to latch NOR gate 180 to a logic 0 output in line 182. Since instruction line $I_0$ is a logic 0, both inputs to the NOR gate 184 are a logic 0. This produces a logic 1 in line $\overline{LPL}$ which is directed to the control line 110*a* of the data selector 110, as shown in FIG. 5C. This allows the accumulator logic to appear at DATA line 122. There is also an invert instruction code; therefore, the accumulator data is inverted by logic selector 130. Consequently, the accumulator data is inverted and restored in the accumulator.

SUMMARY

Each of the various circuits in the programmable controller and the function of the programmable controller have been discussed in connection with the several drawings. These drawings clearly indicate the operation and function of the programmable controller for the purpose outlined in the programming section of the specification.

Having thus described my invention, I claim:

1. A programmable controller for actuating output circuits, each having a selected address, in accordance with the condition of input circuits, each having a selected address, said controller comprising: means for creating a succession of program statements in the form of binary logic, said statements including a binary coded instruction portion indicative of a selected logic function or store function and a binary coded address portion for the source of binary logic to be used in the statement logic function or the location at which data is to be stored; and, means for processing said program statements in succession, said processing means being operable upon a single statement at any given time and includes:

a. a random access memory having several locations for storage of a bit of binary logic, each of said locations having a selected address different from said selected addresses of said output circuits;

b. a one bit accumulator register for storing a single bit of binary logic;

c. a logic circuit for selectively performing a plurality of logic functions;

d. means for decoding said binary coded instruction portion of said single statement to produce a logic selector signal when said instruction portion of said single statement is indicative of a logic function;

e. means for decoding said instruction portion of said single statement to produce a store signal when said coded instruction portion of said single statement is indicative of a store function;

f. means for selecting one of said logic functions in said logic circuit in response to said logic selector signal;

g. means responsive to said binary coded address portion of said single statement for directing a single bit logic from the addressed circuit or addressed random access memory location to said logic circuit when said single statement includes a logic function;

h. means for directing the existing logic of said accumulator register to said logic circuit to obtain a new processed one bit logic when said instruction portion of said single statement causes a logic selector signal and said new processed one bit having a logic relationship to said existing logic determined by the selected logic function of said selector signal;

i. means for directing said processed new one bit logic to said accumulator register; and, j. means for gating said one bit logic to an addressed circuit or addressed memory location when said instruction portion of said single statement includes a store function instruction, said addressed circuit or location corresponding to the address portion of said single statement.

2. A programmable controller as defined in claim 1 including a circuit for creating a one bit binary logic indicative of the condition of each of said input circuits in a circuit output; a latch having input terminals, an output terminal corresponding to each of said input terminals and an enabling terminal for latching the output terminals to logic controlled by the logic on the corresponding input terminals; means for connecting a plurality of said circuit outputs to the input terminals of said latch; and means for periodically creating a strobe for activating said enabling terminal.

3. A programmable controller as defined in claim 2 including means for decoding the logic on said output terminals of said latch in response to the address code of said single statement, said logic decoding means directing the addressed logic to said logic circuit.

4. A programmable controller as defined in claim 2 including an indicator circuit having an input and means for creating an indication when a selected logic is applied to said input of said indicator circuit, actuation means associated with said output terminals for creating said selected logic when said logic on said output terminal indicates that its corresponding input is actuated, and means for connecting said actuation means to said indicator circuit input.

5. A programmable controller as defined in claim 1 including a circuit for creating in an output line a one bit binary logic indicative of the condition of one of said input circuits; a memory device having an input, an output and a means for latching the logic of said input at said output upon receipt of a strobe signal; means for connecting said output line to said memory input; and, means for periodically creating a strobe for latching the one bit binary logic at said memory output.

6. A programmable controller as defined in claim 5 including means connected to said output of said memory device for indicating the condition of said one bit binary logic of said output of said memory device.

7. A programmable controller as defined in claim 6 wherein said indicating means includes a light and means for energizing said light.

8. A programmable controller as defined in claim 1 wherein said gating means includes a plurality of latch means each including an input terminal, an output terminal and a clocking terminal for clocking binary logic on said input terminal to said output terminal upon receiving a pulse; means for directing the logic on said accumulator register to said input terminals of said plurality of latch means, means for decoding said address portion of said single statement to produce a latch clocking pulse, and means for directing said clocking pulse only to the latch means corresponding to the decoded address, whereby the logic on the input of the addressed latch means will be clocked to the output terminal of said addressed latch means.

9. A programmable controller as defined in claim 3 including a means for creating pulses connected to the output terminal of each of said latch means and means for energizing said pulse creating means when said logic on said output terminal of the latch to which said pulse means is connected indicates actuation of the output circuit of said latch means.

10. A programmable controller as defined in claim 9 including a pulse transformer associated with each of said output circuits and having a primary winding energized by one of said pulse creating means and a secondary winding for energizing an output circuit by a pulse in said primary winding.

11. A programmable controller as defined in claim 10 including an indicator means controlled by said primary winding.

12. A programmable controller as defined in claim 8 including separate indicating means controlled by the logic on said output terminal of one of said latch means for indicating the logic condition of said latch means.

13. A programmable controller as defined in claim 8 including a plurality of logic gate means for creating a selected output logic when receiving selected input logics on two inputs of each of said gate means, means for connecting one of said inputs of one of said gate means to each of said output terminals of said latch means and means for directing a strobe pulse simultaneously to the other of said two inputs of said gate means.

14. A programmable controller as defined in claim 13 including means for creating said strobe pulse at a frequency substantially less than the frequency of the change in the program statements.

15. A programmable controller as defined in claim 1 including memory means associated with each of said output circuits for storing one bit logic, a plurality of logic gate means for creating a selected output logic when receiving selected input logics on two inputs of said gate means, means for connecting one of said inputs of one of said gate means to each of said memory means to operate said gate means in accordance with the logic in said memory means, means for directing a strobe pulse simultaneously to the other of said inputs of said gate means, and means for selectively directing said processed one bit logic from said accumulator register to a selected, addressed one of said memory means.

16. A programmable controller as defined in claim 1 wherein said random access memory is a retentive memory means for holding logic at said several locations as long as a voltage of at least a given level is applied to a power terminal of said memory, and a battery means connected to said poser terminal for maintaining a voltage of at least said given level applied to said terminal for at least a given time.

17. A programmable controller as defined in claim 16 including a circuit for charging said battery to a voltage of at least said given level during operation of said controller.

18. A programmable controller as defined in claim 1 including means for selectively inhibiting operation of said gating means.

19. A programmable controller as defined in claim 18 wherein said gating means includes means for producing a gating strobe and a means responsive to said gating strobe for gating said processed one bit logic and said inhibiting means includes means for selectively inhibiting said gating strobe.

20. A programmable controller for logic processing of binary data in accordance with a series of successively processed program statements, a series of output circuits with selected addresses; a random access memory device having locations with selected addresses contained in selected program statements and separate from said selected addresses of said output circuits, said controller comprising: an accumulator register for storing binary logic; means for inserting processed binary logic into said register; means for directing binary logic from said register to a selected location in said memory device upon a specific address appearing in one of said statements concurrently with said memory being actuated; means for creating a repetitive memory strobe; means responsive to concurrent existence of both said memory strobe and said specific address for actuating said memory device to allow insertion of the accumulator logic into said selected memory location; and, means for selectively inhibiting said strobe whereby said specific address appearing in one of said statements will fail to actuate said random access memory device.

21. A programmable controller as defined in claim 20 including means for controlling said strobe inhibiting means in accordance with logic in said accumulator register at a selected time.

22. A programmable controller as defined in claim 20 wherein said memory strobe is a pulse of a selected logic, and said memory strobe creating means is a logic gate having two inputs and an output for said memory strobe, said gate being latched to an output opposite to said selected logic when a given logic is applied to one of said inputs; and, said inhibiting means includes means for selectively creating said given logic and means for connecting said given logic to said one input.

23. A programmable controller as defined in claim 22 wherein said selective creating means is a flip-flop having an output connected to said one input and means for selectively changing the logic on said flip-flop output.

24. A programmable controller for processing binary logic in accordance with a series of successive program statements, some of said statements including a binary coded store logic instruction and a binary coded address indicating a location where logic is to be stored during said store logic instruction, said controller comprising: a single bit accumulator register having a single bit of binary logic therein; means for producing a single bit of binary logic representative of a processed logic function; means for storing the single bit of processed binary logic of said accumulator register in an addressed location when said store logic instruction is included in one of said program statements; and, means for selectively inhibiting said storing means when said store logic instruction is included in one of said program statements.

25. A programmable controller as defined in claim 24 wherein said selectively inhibiting means includes a logic device shiftable between a first logic condition to inhibit said storing means and a second logic condition allowing said storing means, and means for selectively shifting said logic device between said first and second conditions.

26. A programmable controller as defined in claim 25 including means responsive to the single bit logic in said accumulator register at a selected time for controlling said shifting means.

27. A programmable controller as defined in claim 26 wherein said logic responsive means is a D-type flip-flop having its D terminal connected to said accumulator register and its clocking terminal controlled by a means operated in response to a specific program statement.

28. A programmable controller as defined in claim 24 including means responsive to the single bit of logic in said accumulator register at a selected time for controlling said inhibiting means.

29. A system for directing data from one of a plurality of input circuits, each having a selected address, to the logic processing circuit of a programmable controller, said system comprising: input reading means associated with each of said input circuits for creating a first binary logic when said associated input circuit is energized and a second binary logic when said associated input circuit is non-energized; means for creating periodically an input strobe; means responsive to said strobe for storing the created logic of said input reading means in separate addressable means; means for addressing one of said separate addressing means; and means for directing the logic of an addressed, addressable means to said logic processing circuit of said programmable controller and a separate means connected to each of said separate addressable means of said storing means for visually indicating the logic in all of said separate addressable means at any given time.

30. A system as defined in claim 29 wherein each of said separate indicating means includes a light emitting device and means for energizing said light when the addressable means associated with said indicating means has a binary logic indicating that said input circuit corresponding to the associated addressable means was energized at the time of said strobe.

31. A system as defined in claim 30 wherein said light emitting device is a light emitting diode and said energizing means includes a positive voltage on the anode of said diode and means for connecting the cathode of said diode to one of said addressable means whereby a logic 0 created by said address at said cathode will energize said diode.

32. An input device for a programmable controller, said device comprising: a plurality of input circuits, a memory means associated with each of said input circuits for holding a binary logic indicative of the condition of said input circuits at a prior selected time, and means associated with each of said memory means for visually and simultaneously indicating the held logic of all of said memory means.

33. An input device as defined in claim 32 wherein said indicating device includes a light emitting element and means for energizing said element when said held logic is indicative of an actuated condition of said input circuit.

34. A device for energizing output circuits of a programmable controller in accordance with a one bit memory logic stored within a memory device associated with each of said output circuits, said device comprising: a separate one bit logic decoding means connected to each of said memory devices and having an output allowing energization of one of said output circuits when a first one bit logic is stored in the associated memory device and for preventing energization of said output circuit when a second one bit logic is stored in the associated memory device; and, means for providing a repetitive signal attempting to energize each of said output circuits, and said output being connected to the primary winding of a pulse transformer having a primary and secondary winding and means for energizing said output circuit by a pulse created within said secondary winding.

35. A device as defined in claim 34 wherein said output circuit is energized by energizing a triac and a pulse in said secondary winding energizes said triac.

36. A device as defined in claim 35 including generating means for forming a series of pulses in said primary winding, said generating means being driven by said repetitive signal when said first one bit logic is stored in said associated memory device, and a visual indicating means driven by said series of pulses for indicating the existence of said first one bit logic in said associated memory device.

37. A device for energizing output circuits of a programmable controller in accordance with a one bit memory logic stored within a memory device associated with each of said output circuits, said device comprising: a separate one bit logic decoding means connected to each of said memroy devices and having an output allowing energization of one of said output circuits when a first one bit logic is stored in the associated memory device and for preventing energization of said output circuit when a second one bit logic is stored in the associated memory device; and, means for providing a repetitive signal attempting to energize each of said output circuits, and a separate means associated with each of said memory devices for indicating when the first one bit logic is stored in each of said memory devices.

38. A device as defined in claim 37 wherein said indicating means includes a visual indicating circuit and means for energizing said indicating circuit with said repetitive signal only when said first one bit logic is stored in one of said memory devices.

39. A device as defined in claim 38 wherein said circuit includes a light emitting element and means for energizing said element by said repetitive signal when said first logic is in said one memory device.

40. A device for energizing output circuits of a programmable controller in accordance with a one bit binary logic stored within a memory device associated with each of said output circuits, said device comprising: a one bit accumulator register having a first or second one bit of binary logic; means for simultaneously connecting said accumulator register to each of said memory devices; means for selectively energizing one of said memory devices at a time upon receipt of a coded address signal; a separate one bit logic decoding means connected to each of said memory devices and having an output allowing energization of one of said output circuits when a first one bit logic is stored in the associated memory device and for preventing energization of said output circuit when a second one bit logic is stored in the associated memory device; and means for providing a generally uniform, repetitive pulsing signal attempting to energize each of said output circuits.

41. A device as defined in claim 40 including means for selectively inserting the one bit logic of one of said memory devices into said accumulator register.

42. A device for energizing output circuits of a programmable controller in accordance with a one bit binary logic stored within a memory device associated with each of said output circuits, said device comprising: a separate one bit logic decoding means connected to each of said memory devices and having an output allowing energization of one of said output circuits when a first one bit logic is stored in the associated memory device and for preventing energization of said output circuit when a second one bit logic is stored in the associated memory device, an accumulator register for receiving one bit binary logic and means for shifting the logic of a selected one of said memory devices to said accumulator register.

43. In a programmable controller for processing logic from addressed locations and storing logic at addressed locations, said controller including a one bit accumulator register for storing binary logic; means for selectively directing addressed input circuit logic to said accumulator register; means for directing logic of said accumulator register to addressed output circuits and means for directing logic from addressed output circuits to said accumulator register, the improvement comprising: a random access memory having addressable locations for storing binary logic, said locations each having an address separate from said address output circuits; said memory being an integrated circuit including said locations; first means for allowing insertion of binary logic from said accumulator register into an addressed location of said memory; and second means for directing logic from an addressed location of said memory to said accumulator register.

44. The improvement as defined in claim 43 wherein said memory has a power lead which causes said memory to retain logic when a voltage of a given level is applied to said lead and a battery having a voltage above said given level and means for connecting said battery to the power lead of said memory at least when the power of said programmable controller is off.

45. The improvement as defined in claim 44 wherein said controller includes a number of flip-flops and logic latches and means for resetting said flip-flops and logic latches after a power interruption to said controller, the improvement further including means for inhibiting said first means during resetting of said flip-flops and logic latches.

46. The improvement as defined in claim 43 wherein said controller includes a number of flip-flops and logic latches and means for resetting said flip-flops and logic latches, the improvement further including means for enabling said first means during said resetting of said flip-flops and logic latches whereby said location of said memory can be selectively reset.

47. A programmable controller for processing logic data from input and output circuits in accordance with a number of successively created binary coded program statements, each formed during one of a finite number of statement periods, said statements repeatedly reoccurring as said statement periods are cycled, said controller comprising: a plurality of output memory units for storing a known one bit of binary data when said units are to be non-energized; means for creating a statement pulse at a set position in said cycle of statement periods; means for creating a reset signal when said controller is actuated after a power interruption; a counter means for counting said statement pulses from a starting set count to at least one of said statement pulses; said counter means including means for creating an actuation signal until said counter means has counted at least one of said statement pulses; means for resetting said counter means to said starting set count upon receipt of said reset signal; and, means responsive to said actuation signal for setting said plurality of output memory units to said known bit of binary data.

48. A programmable controller for processing logic data from input and output circuits in accordance with a number of successively created binary coded program statements, each formed during one of a finite number of statement periods, said statements repeatedly reoccurring as said statement periods are cycled, said controller comprising: a one bit accumulator register with a desired logic for the start of said cycle of statement periods; means for creating a statement pulse at a set position in said cycle of statement periods; means for creating a reset signal when said controller is actuated after a power interruption; a counter means for counting said statement pulses from a starting set count to at least one of said statement pulses; said counter means including means for creating an actuation signal until said counter means has counted at least one of said statement pulses; means for resetting said counter means to said starting set count upon receipt of said reset signal; and means responsive to said actuation of signal for setting said accumulator register to said desired logic.

49. A programmable controller for processing logic data from input and output circuits in accordance with a number of successively created binary coded program statements, each formed during one of a finite number of statement periods, said statements repeatedly reoccurring as said statement periods are cycled, said controller comprising: a one bit accumulator register with a desired logic for the start of said cycle of statement periods; a plurality of output memory units for storing known one bit of binary data when said units are to be non-energized; means for creating a statement pulse at a set position in said cycle of statement periods; means for creating a reset signal when said controller is actuated after a power interruption; a counter means for counting said statement pulses from a starting set count to at least one of said statement pulses; said counter means including means for creating an actuation signal until said counter means has counted at least one of said statement pulses; means for resetting said counter means to said starting set count upon receipt of said reset signal; means responsive to said actuation signal for setting said accumulator register to said desired logic; and, means responsive to said actuation signal for setting said plurality of output memory units to said known bit of binary data.

50. A programmable controller as defined in claim 49 including a random access memory with several addressed locations, means for allowing writing in any of said addressed locations when a given signal is applied to said random access memory; and, means responsive to said actuation signal for maintaining said given signal applied to said random access memory.

51. A programmable controller as defined in claim 49 including a random access memory with several addressed locations; means for holding logic in said addressed locations; means for allowing writing in said addressed locations when a given signal is applied to said random access memroy; and, means responsive to said actuation signal for blocking application of said given signal to said random access memory.

52. A programmable controller for processing logic data from input circuits in accordance with a number of successively created binary coded program statements, said controller comprising: power means for creating binary logic indicative of the condition of said input circuits as long as said power means is functioning; means for storing said indicative logic upon the receipt of each pulse in a series of repetitive input updating pulses; means responsive to the lack of functioning of said power means for creating a signal for a set time; and means responsive to said signal for inhibiting said pulses of said series of repetitive input updating pulses.

53. A programmable controller as defined in claim 52 including means for allowing said pulses of said series of repetitive input updating pulses after said set time.

54. A programmable controller as defined in claim 53 wherein said allowing means is a circuit having a normal binary logic output when said power means is functioning and an opposite binary logic after said power means is not functioning for said set time.

55. A programmable controller for processing logic data from input circuits in accordance with a number of successively created binary coded program statements, said controller comprising: first circuit means for creating logic indicative of the conditions of said input circuits; means for storing said indicative logic upon receipt of an input updating pulse; a power source having a first active condition and a second inactive condition; and a second circuit means for blocking said input updating pulse for at least a set time when said power source is in said second condition.

56. A programmable controller as defined in claim 55 wherein said first circuit means has a first time required to become active when said power source is shifted into said first condition and a second time to become inactive when said power source is shifted into said second condition; said second circuit means has a third time required to become active when said power source is shifted into said first condition and a fourth time to become inactive when said power source is shifted into said second condition; and, said first time is less than said third time.

57. A programmable controller as defined in claim 56 wherein said second time is greater than said fourth time.

58. A programmable controller as defined in claim 55 wherein said first circuit means has a first time required to become active when said power source is shifted into said first condition and a second time to become inactive when said power source is shifted into said second condition; said second circuit means has a third time required to become active when said power source is shifted into said first condition and a fourth time to become inactive when said power source is shifted into said second condition; and, said second time is greater than said fourth time.

59. In a programmable controller for processing logic data from input circuits to actuate output circuits in accordance with a number of successively created binary coded program statements, said controller comprising: a control circuit for allowing a selected output circuit to be turned on when said control circuit receives a series of grounded pulses; means for creating said series of grounded pulses on a selected line; and means for turning said output circuit off when said selected line is grounded longer than a selected time.

60. A programmable controller as defined in claim 59, wherein said turn off means includes means for creating a voltage greater than ground and means for directing this voltage to said control circuit.

61. A programmable controller for processing logic data from input circuits in accordance with a number of successively created binary coded program statements, said controller comprising: an accumulator register for storing one bit of binary logic; a plurality of memory gates with desired starting logic; an alternating power supply; means for creating a direct current power source having a desired voltage level when said power supply is active; means for detecting when said power source has a voltage less than said desired level; means responsive to said detection means for resetting said memory gates to said desired starting logic; and means for temporarily recording operation of said resetting means.

62. A programmable controller as defined in claim 61 including means for selectively creating a given one bit logic in said accumulator register when said operation of said resetting means has been recorded by said recording means.

63. A programmable controller as defined in claim 61 wherein said recording means is a flip-flop having a first state to record operation of said resetting means.

64. A programmable controller for actuating output circuits, each having a selected address, in accordance with the condition of input circuits, each having a selected address said controller comprising: means for creating a succession of program statements in the form of binary logic, said statements including a binary coded instruction portion indicative of a selected logic function or a store function and a binary coded address portion for the source of binary logic to be used in the statement logic function or the location at which binary data is to be stored when said one of said program statements indicates a store function; and means for processing said program statements in succession, said processing means being operable upon a single statement at any given time and includes:

a. an accumulator register for holding processed binary data;

b. a random access memory device separate from said input circuits and said output circuits and having several locations for storage of binary data, each of said locations having a selected address; and, c. means for transferring said processed binary data from said accumulator register to one of said locations of said random access memory device when said instruction portion of one of said program statements indicates a store function and when said address portion of said one of said program statements corresponds to said one of said locations of said random access memory device.

65. A programmable controller as defined in claim 64 wherein said accumulator register includes means for holding only a single bit of processed binary data.

66. A programmable controller for actuating output circuits, each having a selected address, in accordance with the condition of input circuits, each having a selected address, said controller comprising: means for creating a succession of program statements in the form of binary logic, said statements including a binary coded instruction portion indicative of a selected logic function or a store function and a binary coded address portion for the source of binary logic to be used in the statement logic function or the location at which binary data is to be stored when said one of said program statements indicates a store function; and means for processing said program statements in succession, said processing means being operable upon a single statement at any given time and includes:

a. an accumulator register for holding a single bit of binary data;

b. a logic circuit for selectively performing a plurality of logic functions, said logic circuit including input means for receiving said binary data from said accumulator register and several binary logic performing circuits for processing said binary data and each activated selectively upon creation of a particular logic selector signal by one of said program statements and means for transferring the logic result of said logic performing circuits to said accumulator;

c. means for creating a particular logic selector signal in response to the instruction portion of one of said statements when said instruction portion is indicative of a logic function.

67. A programmable controller as defined in claim 66 including:

d. a random access memory device separate from said input circuits and said output circuits and having several locations for storage of binary data, each of said locations having a selected address; and, e. means for transferring said processed binary data from said accumulator register to one of said locations of said random access memory device when said instruction portion of one of said program statements indicates a store function and when said address portion of said one of said program statements corresponds to said one of said locations of said random access memory device.

* * * * *